United States Patent [19]

Higuchi et al.

[11] Patent Number: 5,708,133
[45] Date of Patent: Jan. 13, 1998

[54] PROCESS FOR PURIFYING POLYMER

[75] Inventors: Yasushi Higuchi; Shojiro Kuwahara; Shinichi Hieda; Masahiro Kurokawa, all of Hiratsuka, Japan

[73] Assignee: Mitsubishi Gas Chemical Company, Inc., Tokyo, Japan

[21] Appl. No.: 642,797

[22] Filed: May 3, 1996

Related U.S. Application Data

[63] Continuation-in-part of Ser. No. 326,077, Oct. 19, 1994, abandoned.

[30] Foreign Application Priority Data

Nov. 9, 1993 [JP] Japan ..................... 5-279862

[51] Int. Cl.⁶ ................. C08F 6/28; C08F 6/24
[52] U.S. Cl. ................ 528/496; 528/481; 528/483; 528/501; 528/502 R
[58] Field of Search ............... 528/493, 496, 528/481, 483, 501, 502 R, 503; 526/212

[56] References Cited

U.S. PATENT DOCUMENTS

| | | | |
|---|---|---|---|
| 3,252,950 | 5/1966 | Terenzi et al. | 528/501 X |
| 3,987,235 | 10/1976 | Fujimoto | 528/496 X |
| 4,439,601 | 3/1984 | McCurdy et al. | 528/501 X |
| 4,711,938 | 12/1987 | Suka et al. | 528/501 X |
| 4,728,701 | 3/1988 | Jarvis et al. | 528/501 X |
| 4,906,329 | 3/1990 | Tominari et al. | 528/501 X |

OTHER PUBLICATIONS

Werner, "Devolatilisation of polymers..." Kunststoffe, 71 (1981) 99–132.

*Primary Examiner*—Fred Teskin
*Attorney, Agent, or Firm*—Frishauf, Holtz, Goodman, Langer & Chick, P.C.

[57] ABSTRACT

A process for purifying a polymer by separating and removing volatile components from a polymer composition containing the volatile components, which comprises: (a) heating the polymer composition containing a methanol solvent to a temperature of 120° to 240° C. by a heater, wherein an internal pressure the heater is maintained at 8 to 35 kg/cm²G; (b) discharging the heated polymer composition into a tank in which pressure is maintained at −0.7 to 1.0 kg/cm²G, and then separating and collecting most of the volatile components to lower the concentration of the solvent in the remaining volatile components in the polymer composition to 0.5% by weight or less; and (c) feeding the resultant polymer composition to a vent extruder maintained such that a barrel temperature at an inner side thereof is 160° to 280° C. and pressure in a vent portion is 5 to 400 Torr, and then extruding the polymer composition to lower the content of the remaining volatile components in the composition to 1% by weight or less. Alternatively, between the above-mentioned steps (b) and (c), there can be interposed a step (b') of introducing an inert gas into the polymer composition before heating or during heating, or in the vicinity of the polymer composition which is being discharged into the tank. By using this process, a polymer can easily be separated and purified, so that a high-quality polymer, particularly a methyl methacrylate polymer, can be efficiently manufactured, without polymer discoloration.

15 Claims, 7 Drawing Sheets

PROCESS FOR PURIFYING POLYMER

CROSS-REFERENCE TO RELATED APPLICATION

This application is a continuation-in-part application of application Ser. No. 08/326,077 filed Oct. 19, 1994 (abandoned).

BACKGROUND OF THE INVENTION (i) Field of the Invention

The present invention relates to a process for purifying a polymer, and more specifically, it relates to a process for purifying a polymer by efficiently removing volatile components such as unreacted monomers and a solvent from a polymer composition obtained by a solution polymerization process or the like.

(ii) Description of the Related Art

In recent years, methacrylate polymers having excellent characteristics in points of transparency, weathering resistance and surface gloss have widely been used in various applications such as car parts, light electric parts, optical materials, and materials for lights, signs and displays. Heretofore, usually as a manufacturing method for methacrylic resin molding materials, a suspension polymerization method has been used, but this method inconveniently involves some problems such as the contamination of a polymer and the complication of a washing step and a waste water treatment step. Accordingly, much attention has nowadays been paid to a solution polymerization method as an excellent process from the viewpoints of economy and product quality.

In this solution polymerization method, a devolatilization step is essential where volatile components such as unreacted monomers and a solvent which remain in a polymerization solution are removed after the completion of the polymerization. In such a method for removing the volatile components from the polymer composition, the polymer composition is generally heated to a high temperature, and then introduced into a vacuum atmosphere to evaporate and separate the volatile components therefrom. This method is suitable for mass production on an industrial scale, because it permits the treatment of a large amount of the polymer composition at once.

As one example of this method, Japanese Patent Publication No. 29797/1978 has reported a method which comprises heating a polymer solution by the use of a multitubular type heat exchanger, and then flushing the heated solution with bubbles into a devolatilizing tank in which pressure is reduced, thereby removing volatile components therefrom.

In this method, it is necessary that the polymer composition is beforehand sufficiently heated for the purpose of lowering the concentration of the remaining volatile components in the obtained polymer. Furthermore, the polymer composition flushed into the devolatilizing tank foams due to the evaporation of the volatile components, and at this time, owing to cooling by evaporation latent heat, the viscosity of the polymer composition increases, so that the separation of the volatile components is liable to become poor. In order to prevent this inconvenience, the polymer composition is heated again in the devolatilizing tank to maintain its fluidity and simultaneously the polymer is continuously taken out through the bottom of the devolatilizing tank by a gear pump or the like. In the flush operation and the takeout operation, a part of the polymer unavoidably splashes to adhere to the wall surface of the devolatilizing tank or stagnates on the bottom of the devolatilizing tank. Thus, the polymer is exposed to the above-mentioned operation conditions, i.e., the high temperature for a long period of time, so that deterioration by heat tends to occur. In addition, another problem is the contamination of the polymer with dust present on the liquid contact surface of the gear pump or an oil for a mechanical seal. In the methacrylate polymer particularly characterized by transparency, even slight deterioration or contamination gives rise to coloring, which easily causes the deterioration of quality.

As described in Japanese Patent Application Laid-open No. 172401/1989 and the like, in the solution polymerization for the methacrylic polymer, an alkylbenzene such as toluene is usually often used as a solvent. However, it is difficult to remove the volatile components from the polymer composition after the polymerization, if the pressure in the devolatilizing tank is not maintained at an absolute pressure of about 150 Torr or less. However, in order to maintain this vacuum degree, the vapor of the evaporated and separated volatile components must be rapidly taken out of the devolatilizing tank, and it is also necessary to condense the vapor of the low-pressure volatile components by a heat exchanger to efficiently collect them. In consequence, the load of a vacuum device and freezing facilities increases, which is economically disadvantageous.

In Japanese Patent Application Laid-open No. 281504/1991, a devolatilizing tank equipped with a gear pump for takeout having a specific structure is used, and a polymer composition is fed to an engaging portion between gears of the gear pump, while its rotational speed is controlled, to intend an efficient devolatilizing operation. However, in order to treat a great deal of the polymer composition, the large specific gear pump is required and the cost of the facilities increases. In addition, since a liquid contact area and a stagnation portion also increase, and so the influence of contamination and deterioration by heat on the product cannot be neglected.

Moreover, Japanese Patent Publication No. 29914/1976 has disclosed a method in which a polymer composition is heated to a high temperature, and then directly blown into the feed screw of a vent extruder to evaporate volatile components. However, also in this method, the large vent extruder is required, which increases the cost of the facilities. In addition, since the volume of an evaporating portion is small, it can be presumed that the polymer composition treatment ability of the vent extruder is limited, and so this method is not always suitable for mass production.

In Japanese Patent Application Laid-open No. 89710/1987, another method is disclosed in which a methacrylate polymer composition is heated to a high temperature, cast and dropped into a devolatilizing tank having a space in its upper portion to remove volatile components, and then fed to a vent extruder to lower the content of the remaining volatile components to 1% by weight or less. In this method, however, the polymer composition is beforehand heated up to a high temperature of 200° C. or more, and the vent extruder having a high devolatility performance is required to be used. Thus, the problems of the deterioration of the polymer by heat and the increase in the cost of the facilities are not solved yet.

SUMMARY OF THE INVENTION

An object of the present invention is to provide a process for purifying a polymer by efficiently removing volatile components from a polymer composition without deterioration such as coloring.

The present inventors have found the following fact. When a polymer composition containing a specific low-boiling solvent is discharged under substantially atmospheric pressure after the heating of the polymer composition with or without the introduction of an inert gas, a liquid film having a large surface area can be formed in the vicinity of the exit, whereby a large evaporation area is secured. As a result, most of the volatile components can efficiently be removed from the polymer composition, and when this polymer is fed to a vent extruder and then extruded thereby, a high-quality polymer which can be used as a molding material can be manufactured without deterioration such as coloring. The present invention has been completed on the basis of this knowledge.

That is to say, according to the present invention, there is provided a process for purifying a polymer by separating and removing volatile components from a polymer composition containing the volatile components which comprises:

Alternatively, between the above-mentioned steps (b) and (c), there can be interposed a step (b') of introducing an inert gas into the polymer composition before heating or under heating, or into the vicinity of the polymer composition which is being discharged into the tank.

DESCRIPTION OF PREFERRED EMBODIMENTS OF THE INVENTION

Figure 1:
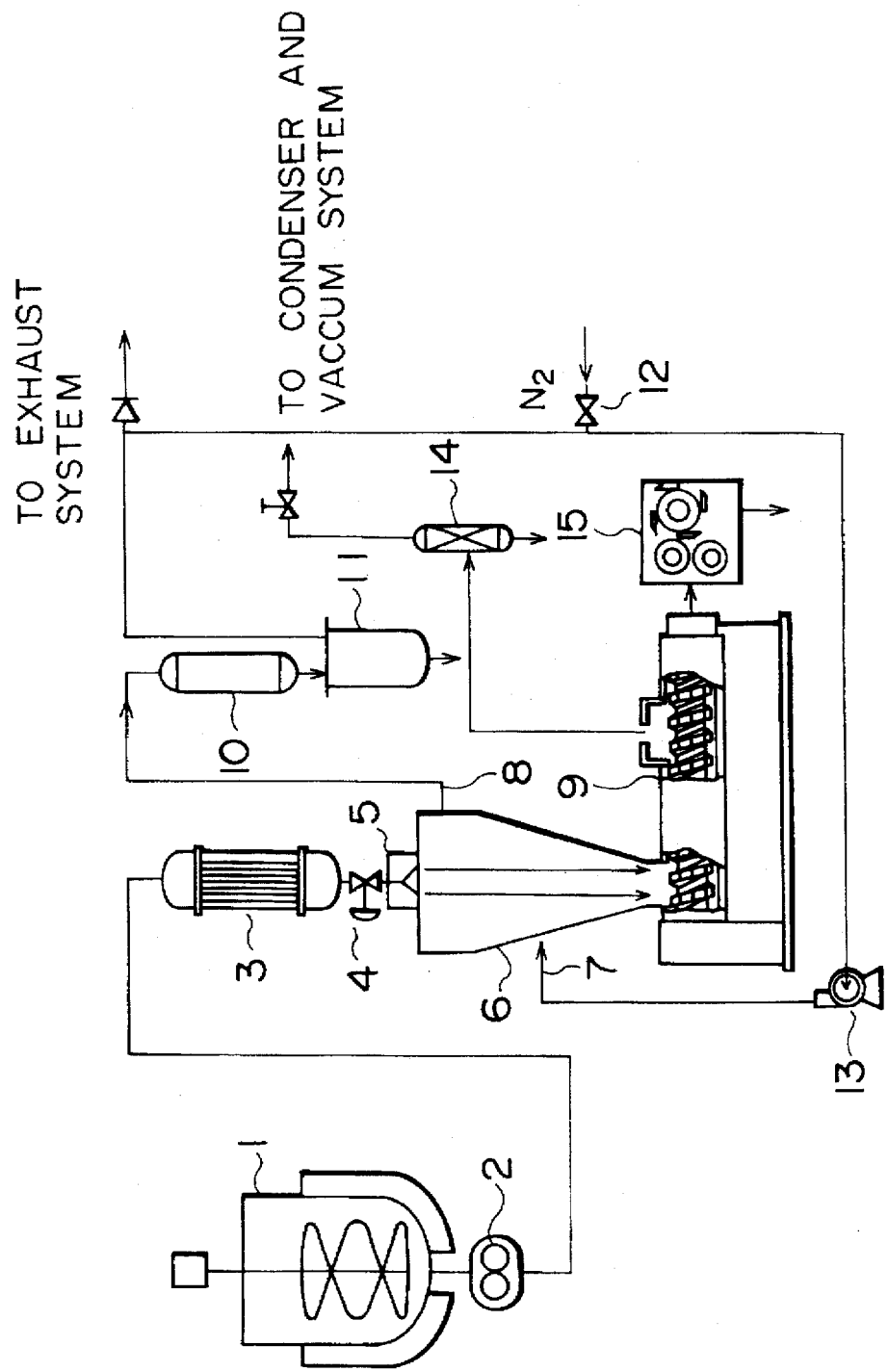
FIGS. 1 and 2 are each a schematic flow sheet of a device used in the practice of a process of the present invention.

In the present invention, volatile components in a polymer composition are derived from monomers, a solvent and/or by-products. Here, the solvent is methanol or and the methanol may contain a small amount of acetone. Since methanol has the following features, the efficient separating operation of the volatile components has become possible.

(1) The methanol easily evaporates at a low boiling point, and when the polymer composition is heated, the solvents can maintain the same at a high pressure and accelerate foaming in a discharge step.

(2) Methanol can form a low-boiling mixture like an azeotrope with the methacrylate or the acrylate monomer to accelerate the evaporation of the monomer components.

(3) Methanol has a polymer dissolving power enough to maintain the uniformity of the polymer composition in a wide concentration range at the time of heating.

(4) When the polymer composition containing the methanol is cooled, the solubility of the volatile components in the polymer rapidly decreases, so that the volatile components are easily separated from the polymer and the polymer becomes less adhesive to the inside walls of a device and pipes.

The polymer composition can be discharged directly from the exit of the heater into the tank, but usually a nozzle or the like is used.

As a nozzle attached to an outlet in a tank into which the polymer composition is discharged, various valves and dies for use in extruders can be used. Examples of the valves include various kinds of valves such as a needle valve, a purge valve, a vent plug and a diehead valve which can be used to take out the polymer from a polymerization vessel, and examples of the dies include a strand die for granulation, various flat dies (T-dies) for sheets such as a manifold die, a fishtail die, a coathanger die and a screw die, various circular dies for tubes such as a straight die, a crosshead die and an offset die, and various inflation dies for bag making such as a spider type, a spiral type and a lower support type. They may be used singly or in a combination of two or more thereof. These flush nozzles generate a pressure difference between a heater side and a tank side to maintain a pressurizing state in the heater and to prevent a rapid foaming devolatilization from reaching the inside of the heater, thereby heightening the heat exchange ability of the heater. In addition, the flush nozzle enlarges the surface area of the flushed polymer composition to accelerate the evaporation and separation of the volatile components. The polymer composition discharged through the flush nozzle flows down vertically at a constant flow rate in the tank, and so it neither scatters nor splashes, so that the polymer composition can be prevented from adhering to the inside wall of the tank, with the result that the polymer composition can be formed into a predetermined sectional shape and then stably fed to the extruder. When the strand die or the valve is used, the opening diameter of its pore or orifice is selected in the range of 0.5 to 15 mm, preferably 1 to 10 mm. The slit or gap of the other die preferably has a width of 0.3 to 8 mm. If the opening diameter is too small, such an excessive pressure difference as to be in excess of the pressure resistance limit of the heater or the like is generated, which is dangerous, and if it is too large, the foaming devolatilization reaches the inside of the heater, so that it is difficult to carry out the stable flush operation. The systematic values of the flush nozzle are decided in consideration of an optimum devolatilization effect and economy in compliance with the amount of the polymer composition to be discharged.

Here, the term "devolatilization" means that the volatile components are removed by evaporation from the polymer.

The flush nozzle may be arranged on either position of the upper flange and the inside of the tank, but this flush nozzle is required to be arranged as close as possible to the exit of the heater so as to be sufficiently warmed. When arranged in the tank, this flush nozzle can be arranged close to the feed portion of the extruder installed under the tank, whereby the flushed polymer composition can be directly blown against the screw of the extruder.

The polymer composition is discharged into an atmosphere having a pressure in the vicinity of atmospheric pressure in the range of 0.7 to 1.0 kg/cm$^2$G (gauge pressure), preferably −0.5 to 0.5 kg/cm$^2$G in the tank. If the pressure atmosphere is more than 1.0 kg/cm$^2$G, the evaporation rate of volatile components such as the methacrylate monomer and the solvent contained in the polymer composition is low, so that the separation of the volatile components is insufficient. If it is less than 0.7 kg/cm$^2$G, a large-scale vacuum device and freezer are required to collect the low-boiling volatile components and to maintain the vacuum degree in the tank, and this is not economical. In order to avoid the deterioration of the polymer, an atmosphere comprising an inert gas such as a nitrogen gas and/or the vapor of the volatile components constituting the polymer composition is desirable, and for the purpose of accelerating the takeout of the volatile component vapor, the inert gas can be introduced into the tank and caused to flow therein. In this case, inert gases such as nitrogen and carbon dioxide can be used, but nitrogen is particularly preferable. The volatile components evaporated and separated from the polymer composition are usually taken out of the tank by an exhaust system such as an ejector, a blower or a vacuum pump, and then led into a condenser or the like in which the volatile components are cooled, condensed and collected. Furthermore, most of a noncondensable gas such as the inert gas introduced at this time can also be collected through the exhaust system, returned to the tank by the blower or the like, and then circularly used.

In the present invention, when desired, the inert gas can be introduced into the polymer composition, but the inert gas to be introduced is the gas which neither reacts with nor deteriorates the polymer composition even at a high temperature during the devolatilizing operation. Examples of the inert gas include nitrogen, carbon dioxide, argon, helium, methane, ethane and propane, but particularly preferable is nitrogen. This inert gas is introduced into the tank at a flow rate necessary to maintain the flushed polymer composition in a suitable foaming state. If the flow rate is too high, the pressure at the feed opening of the heat exchanger for heating the polymer composition rises to exceed the pressure resistance limit of the device on occasion, which is dangerous, and the polymer splashes and adheres to the wall of the device at the time of the flush operation to clog a discharge opening for the volatile vapor, with the result that the stable running operation becomes difficult. If the flow rate is too low, the separation of the volatile components from the flushed polymer composition is liable to be insufficient. No particular restriction is put on the amount of the inert gas to be introduced, so long as the above-mentioned problems do not take place, but in general, the flow rate of the inert gas is preferably 1 to 500 times as much as the volume flow rate of the polymer composition.

An introduction site of the inert gas is arranged in the polymer composition before the heating or under the heating or in the vicinity of the polymer composition which is being discharged into the tank, and at a position where the foaming of the polymer composition can effectively be accelerated. For example, the following introduction manner is effective. When the inflation die is used at an outlet, the inert gas is introduced into an attached gas introducing portion for inflation; when the circular die is used, it is introduced into the central portion of the die; or when the valve or a die other than the above-mentioned dies is used, it is directly introduced into the polymer composition immediately before the flush operation.

If the polymer composition which contains a specific solvent and has a sufficient pressure and which is heated to a temperature enough to give fluidity is discharged into an atmosphere having a pressure in the vicinity of the atmospheric pressure, the low-boiling components in the polymer composition first rapidly evaporate in the vicinity of a discharge opening and the polymer jets while foaming. With this jet, other volatile components in the polymer composition, mainly the monomers also evaporate simultaneously, so they are easily separated. In the case that the inert gas is introduced into the polymer composition at this time, a liquid film having a further large surface area is formed at the discharge opening to secure a large evaporation area, whereby the volatile components in the polymer composition can be more effectively separated and removed. Therefore, even if the heating temperature of the polymer composition is set to a level lower than in the case that the inert gas is not introduced, the volatile components can be removed in a similar ratio, and hence the polymer having a high quality can be manufactured without suffering deterioration by heat.

The pressurizing state in the heater has a large influence on the separation of the volatile components at an internal time of an internal flush operation, and thus, when the pressure of the heater is maintained at 8 to 35 kg/cm$^2$G (gauge pressure), preferably 10 to 30 kg/cm$^2$G, the volatile components can be effectively devolatilized from the polymer composition.

The polymer composition discharged into the tank is cooled by the evaporation latent heat of the volatile components and the flowing inert gas to become a high-viscosity state, while foaming. At this time, the temperature of the composition discharged in the tank is in the range of 80° to 170° C., preferably 90° to 165° C. If the temperature is less than 80° C., the foaming polymer solidifies so rapidly that the volatile components are scarcely separated and the separated volatile components condense in the tank to make their removal difficult. If it is more than 170° C., the polymer is liable to bring about the deterioration by heat. The polymer can take an optional condition of from a solid state to a melting state in the tank in accordance with its properties and the heating temperature, but any condition is acceptable, so long as the takeout from the tank and the feed to the extruder can be stably performed. However, if the polymer completely solidifies, it forms bridges in the lower portion of the tank and clogging easily occurs, so that the feed to the extruder is impeded. On the other hand, if the polymer is in a highly fluid melting state, it flows and easily stagnates on the lower portion of the tank and the inside wall of the feed portion of the extruder to cause the deterioration by heat and contamination. For these reasons, the polymer preferably has a suitable flexibility and plasticity as well as characteristics by which the polymer scarcely adheres to the inside wall. This suitable temperature range can naturally be maintained by keeping a good thermal balance between discharge and takeout of the polymer composition, the inert gas and the volatile components in the tank, even if heating and cooling are not particularly given from the outside.

The concentration of the remaining volatile components in the polymer composition taken out of the tank is maintained in the range of 0.5 to 12% by weight, preferably 1 to 8% by weight, and in general, the polymer composition is then directly fed to the vent extruder. However, in the case that a crusher is installed in the tank, the polymer composition can be crushed, prior to its feed to the vent extruder.

In the remaining volatile components in the polymer composition discharged from the tank, the concentration of the solvent is maintained to 0.5% by weight or less, preferably 0.005 to 0.1% by weight, particularly preferably 0.01 to 0.1% by weight. When the concentration of the solvent in the remaining volatile components exceeds 0.5% by weight, the melt viscosity at the extruding temperature is lowered to easily cause a so-called vent-up, so the amount of polymer fed to the extruder must be lowered to slow-down the production rate. Thereby, the residence time of the polymer in the extruder becomes longer. In order to reduce the concentration of the solvent in the remaining volatile components, the extrusion treatment must be conducted at a higher temperature, and by a larger extruder. Such a high temperature and a longer residence time to receive thermal history cause coloring (discoloration) or burn marks of the resultant polymer.

As the extruder to be used, a usually designed vent extruder equipped with at least one front vent can be selected, and for example, single-screw and twin-screw vent extruders are preferable, but in compliance with a use purpose, an extruder equipped with a multi-stage front vent and/or a multi-stage rear vent can also be used. The L/D of the extruder is preferably in the range of about 20 to 40. Temperatures of the respective portions of the vent extruder can be set to levels suitable for the molding in accordance with a kind and a brand of polymer to be prepared, but in general, the temperatures of the vent portion and a barrel are maintained in the range of 160° to 280° C., preferably 180° to 250° C. The pressure in the vent portion is in the range of 5 to 400 Torr (absolute), preferably 50 to 200 Torr. Since most of the volatile components are separated and removed in the tank, the vent portion need not particularly be maintained under high vacuum. The residence time of the polymer composition in the vent extruder is in the range of 2 to 15 minutes, preferably 3 minutes or more to less than 10 minutes. Furthermore, additives such as an ultraviolet absorber, a lubricant, a stabilizer and a colorant can be mixed with the polymer by this extruder. The thus extruded polymer is cut by a pelletizer or a hot cut pelletizer to obtain the polymer containing 1% by weight or less, usually 0.5% by weight or less of the remaining volatile components which is usable as a molding material.

The heating temperature of the polymer composition depends upon the composition of the volatile components in the polymer composition and evaporation latent heat, but it is usually selected in the range of 120° to 270° C., preferably 150° to 230° C. in view of the viscosity and the thermal stability of the polymer composition. Moreover, the pressure in the heater depends upon the composition of the volatile components in the polymer composition, the heating temperature and the feed rate of the polymer composition, the amount of the inert gas to be introduced, and pressure loss by the heater and the flush nozzle, but no particular restriction is put on the pressure in the heater, so long as it does not exceed the pressure resistance limit of the heater, the die, pipes and the like.

As the heater for the polymer composition, a heat exchanger is usually used, and a multitubular heat exchanger, a plate fin type heat exchanger and a static mixer type heat exchanger are preferable, but a stirring tank or a horizontal reactor equipped with a screw or a stirrer may also be used. In order to avoid the heat deterioration of the polymer composition, the polymer composition is required to be heated up to a predetermined temperature in the shortest possible time, and the heat exchanger having a structure which permits an efficient heat exchange is desirable. This heater may be arranged on either position of the upper flange and the inside of the tank, but the heater is required to be arranged as close as possible to the tank so that the heated polymer composition may be rapidly flushed.

In the process of the present invention, the facilities can be more simplified as compared with a conventional method in which the polymer is molten in a high-temperature tank and then taken out therefrom by a gear pump or the like, and the use of the moderate operation temperature is also possible. In addition, heat history can be shortened and an area of the contact surface of the device with the polymer which causes contamination can be reduced. In consequence, the methacrylate polymer which hates the deterioration by heat and the contamination can be advantageously treated, inhibiting the coloring phenomenon, without impairing appearance. Moreover, the consumption of energy necessary for the collection of the volatile components under the reduced pressure, the retention of the vacuum state in the tank and the maintenance of the fluidity of the polymer can be reduced, and the power of facilities such as the vacuum device, the condenser and the extruder may be low. As a result, a utility unit and the cost of the facilities can be decreased, which permits the polymer to be economically advantageously manufactured.

The process of the present invention can be applied to various kinds of polymers, but typical examples of the applicable polymers include methyl methacrylate alone and copolymers which can be produced by polymerizing monomer mixtures of methyl methacrylate as a main component and the following monomers copolymerizable with methyl methacrylate. No particular restriction is put on the polymer composition, but it usually comprises 90 to 30% of the polymer and 5 to 55% by weight of the unreacted monomer components.

Examples of the monomers which can be copolymerized with methyl methacrylate include methyl acrylate, ethyl acrylate, propyl acrylate, butyl acrylate, cyclohexyl acrylate, ethyl methacrylate, propyl methacrylate, n-butyl methacrylate, cyclohexyl methacrylate, styrene and N-phenylmaleimide, and above all, a combination of methyl methacrylate and methyl acrylate, a combination of methyl methacrylate and n-butyl acrylate, a combination of methyl methacrylate and ethyl acrylate and a combination of methyl methacrylate and styrene are particularly preferable.

In order not to impair characteristics of the methacrylate polymer such as transparency and weathering resistance, the polymer preferably contains 50% by weight or more, more preferably 75 to 100% by weight of methyl methacrylate, but the copolymer of methyl methacrylate and styrene may be composed of 30 to 74% by weight of methyl methacrylate and 70 to 26% by weight of styrene.

The process for removing the volatile components according to the present invention can be applied, as a polymer separation step, to a polymer manufacturing process in accordance with a continuous solution polymerization method or a bulk polymerization method. In this case, however, as continuous preparation methods of the polymer composition, there can be considered, for example, (1) a method in which a mixture of monomer components containing methyl methacrylate and/or styrene as main components and methanol is continuously solution-polymerized in the presence of a polymerization initiator and a chain transfer agent, and (2) a method in which monomer components alone containing methyl methacrylate and/or styrene as main components, or a mixture of monomer components for copolymerization and a small amount of methanol is bulk-polymerized in the presence of a polymerization initiator and a chain transfer agent, and methanol is further added to and mixed with the resulting reaction product.

The polymer can be manufactured by any method, but the optimum composition and method should be selected in consideration of the monomer components, physicochemical properties of the produced polymer and some advantages of the process. In addition, the process of the present invention can also be applied to the treatment of the polymer compositions obtained by other various methods.

The polymer composition in the present invention contains the polymer, the monomer components and the solvent as the main components as well as the polymerization initiator, the chain transfer agent and components derived from additives which are added at the time of the polymerization. The polymerization solution of the above-mentioned solution polymerization method using methanol or the like as the solvent may be directly treated, or methanol may be added to the polymerization solution of the bulk polymerization method or the solution polymerization method, prior to the treatment. No particular restriction is put on the composition of the polymer, and the composition depends upon situations and it cannot be fixedly determined, but the content of the polymer is usually in the range of 30 to 90% by weight. If the content of the polymer is more than 90% by weight, the polymer composition is very viscous, so that the movement and flow of the polymer composition in a pipe and the heater are difficult sometimes. If it is less than 30% by weight, the remaining volatile components in the obtained polymer increase and a production efficiency also deteriorates, which is impractical. The polymer composition contains 5 to 55% by weight, preferably 10 to 40% by weight of the monomer components. The polymer composition in which the content of the monomer components is less than 5% by weight can scarcely be obtained in fact, and if the content of the monomer components is more than 55% by weight, the amount of the remaining monomer components in the obtained polymer increases, which is not practical. Furthermore, the solvent is contained in the polymer composition in the range of 5 to 65% by weight, preferably 6 to 35% by weight. If the concentration of the solvent is less than 5% by weight, the remaining volatile components in the polymer increase, and if it is more than 65% by weight, the productivity declines, which is not efficient. This polymer composition is required to be maintained at a temperature at which the polymer composition has a uniform viscosity capable of giving fluidity thereto, and in the case that the solution polymerization using methanol is carried out, the polymer composition is preferably maintained in the vicinity of a polymerization temperature.

In the polymer composition for use in the present invention, a weight ratio of the monomer components to the methanol solvent is usually in the range of 0.3 to 8, more preferably 0.5 to 4. If the weight ratio of the monomer components to the solvent is more than 4, the removal of the volatile components is insufficient, and the remaining volatile components in the polymer increase inconveniently.

Next, the present invention will be described in more detail with reference to attached drawings.

Figure 2:
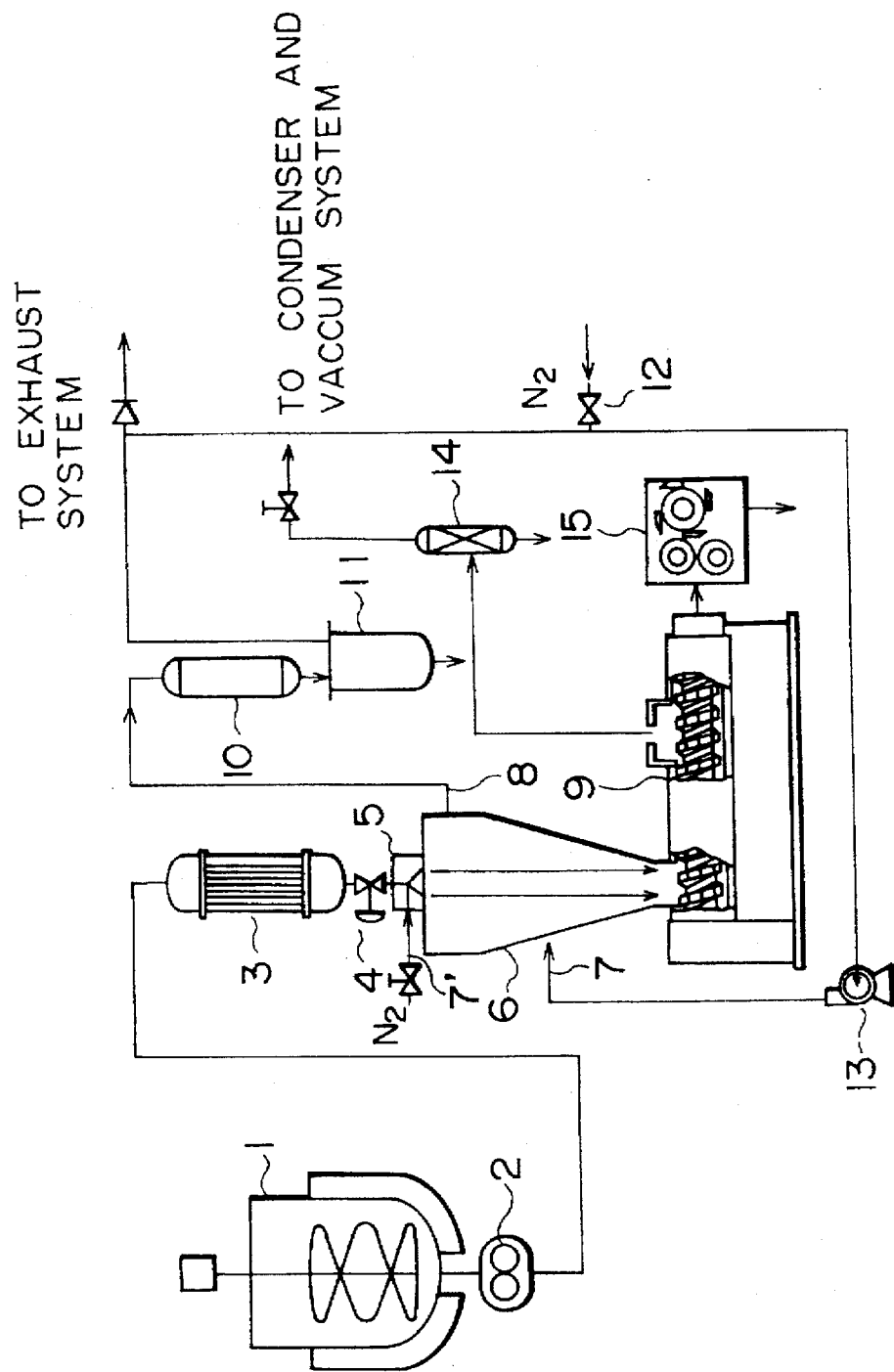

FIGS. 1 and 2 are each a schematic flow sheet of a device used in the practice of a process of the present invention.

A polymer composition is prepared in a stirring tank 1, fed to a heater 3 at a predetermined flow rate by a metering pump 2, and then heated to a predetermined temperature. The exit of the heater is directly connected to a tank 6. Next, the polymer composition is flushed into the tank 6 through a flush nozzle 5, while the internal pressure of the heater and the discharge flow rate of the polymer composition are adjusted by a control valve 4. At this time, an inert gas (e.g., a nitrogen gas) can be introduced into the polymer composition through an inert gas inlet 7' of the flush nozzle 5 at a predetermined flow rate under pressure (see FIG. 2). Furthermore, an inert gas such as a nitrogen gas is also introduced into the tank 6 through an inlet 7 at a lower position of the tank, and the inert gas is caused to flow in the tank.

Evaporated volatile components are taken out together with the nitrogen gas through an exhaust vent 8 at an upper portion of the tank, condensed in a condenser 10, and then collected in a receiver 11. A part of the nitrogen gas is discharged from the system, but most of the nitrogen gas is returned to the tank 6 by a blower 13, and it is collected and circularly used in the system.

The jetted and foamed polymer flows down in the tank 6, introduced into a feed portion of a vent extruder 9 directly connected to the bottom of the tank 6, continuously extruded by the extruder 9, and then cut into pellets suitable for their use in various molding machines by a pelletizer 15. The volatile components separated in the vent extruder 9 are sucked through 1 to 3 vent holes by a vacuum system, and high-boiling components are then removed by a distillation column 14. Afterward, the volatile components are collected by a condenser, and then forwarded to a vacuum system. The nitrogen gas is fed through a valve 12, so that the system is maintained at a predetermined pressure.

Figure 3:
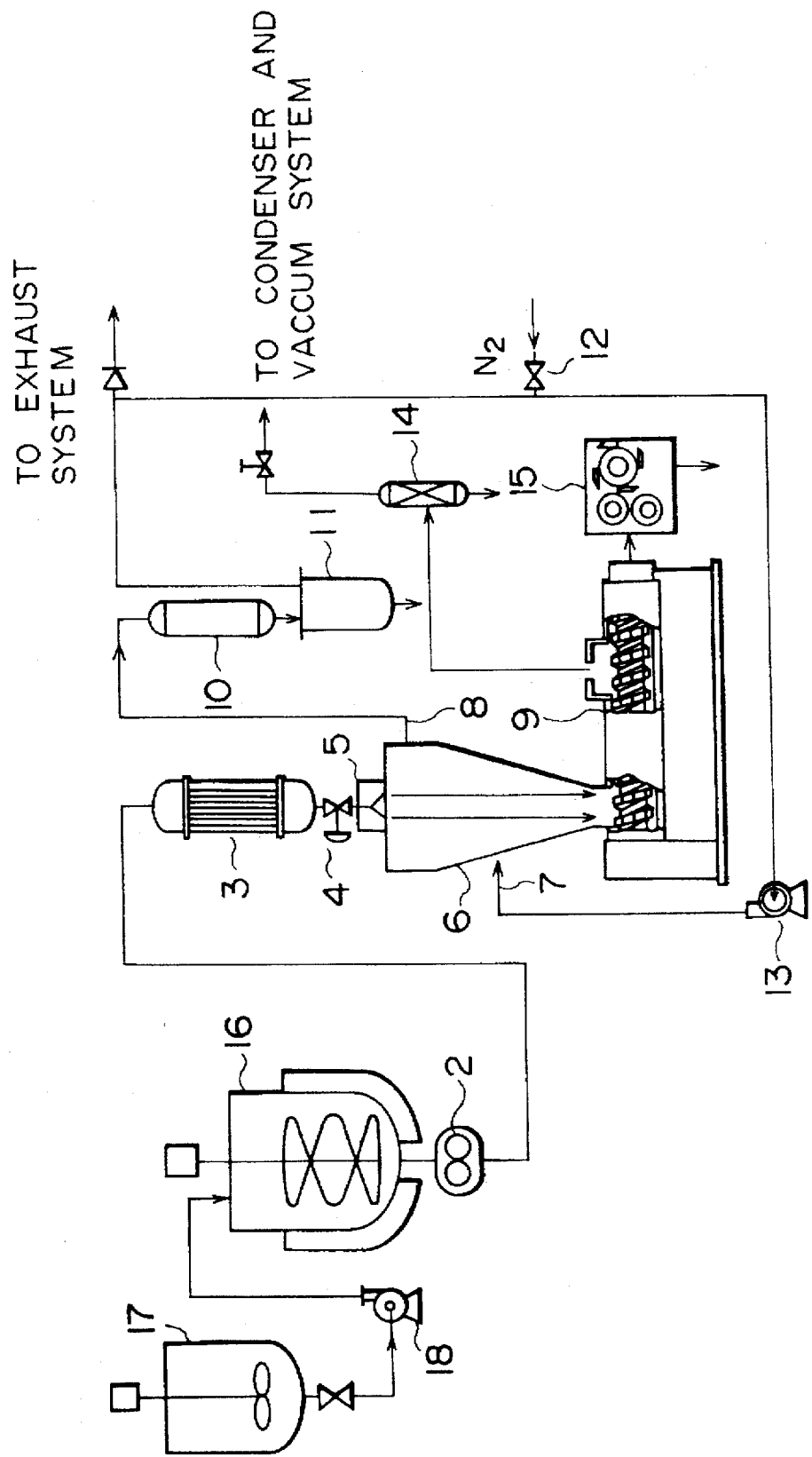
FIGS. 3 and 4 are each a schematic flow sheet of a polymer manufacturing process in accordance with a continuous solution polymerization method to which a process of the present invention is applied.
Figure 4:
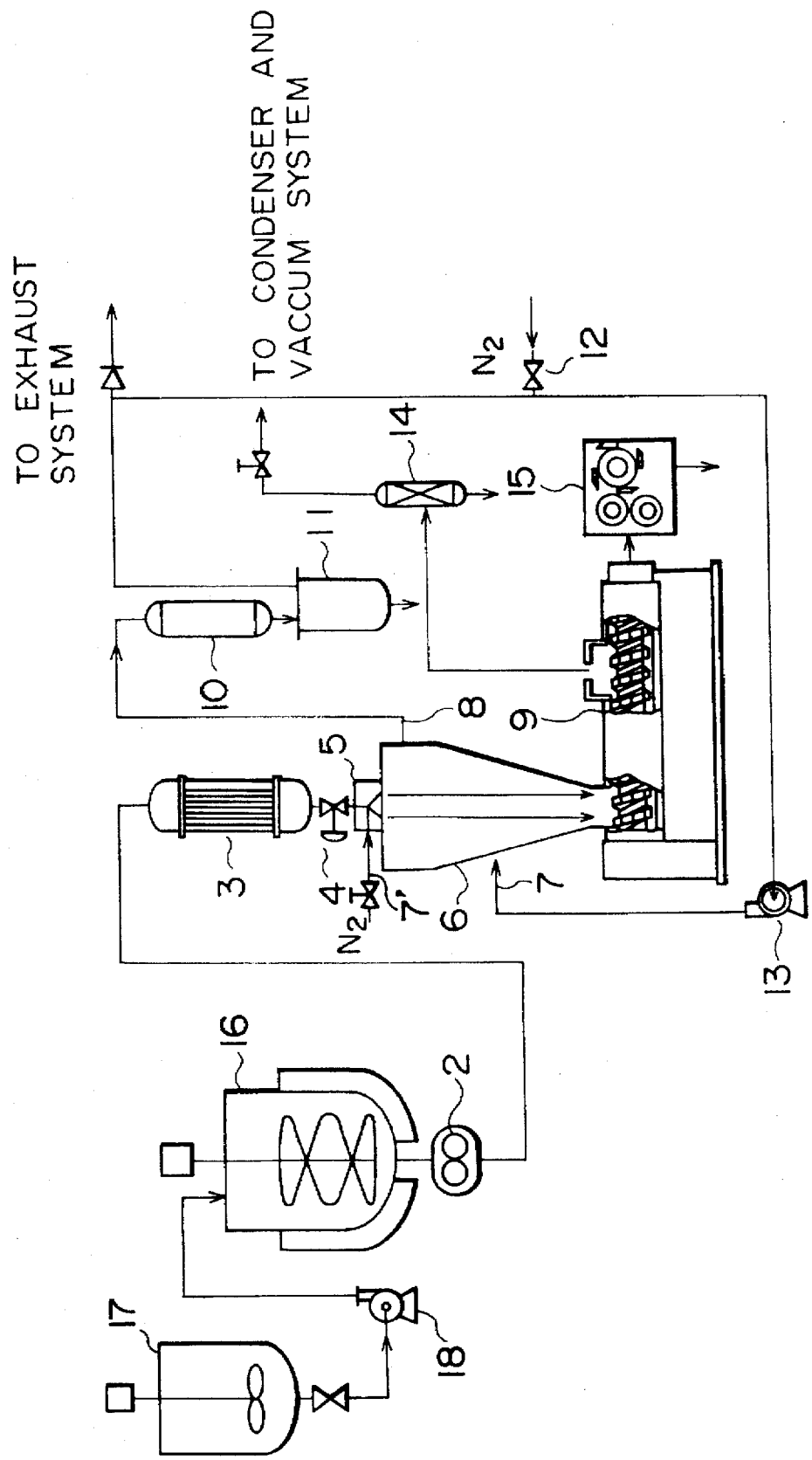

FIGS. 3 and 4 are each a schematic flow sheet of a polymer manufacturing process in accordance with a continuous solution polymerization method in which a process of the present invention is applied. In this case, monomer components, methanol, a polymerization initiator, a chain transfer agent and the like are blended in a blend tank 17 to prepare a material solution, and this material solution is then fed to a complete mixing polymerization reactor 16 at a constant flow rate by a metering pump 18, in which polymerization is continuously carried out. Next, this liquid polymerization product is drawn by the metering pump 2 and introduced into the heater 3, and it is then treated in the same manner as in FIGS. 1 and 2 to continuously prepare the polymer.

Figure 5:
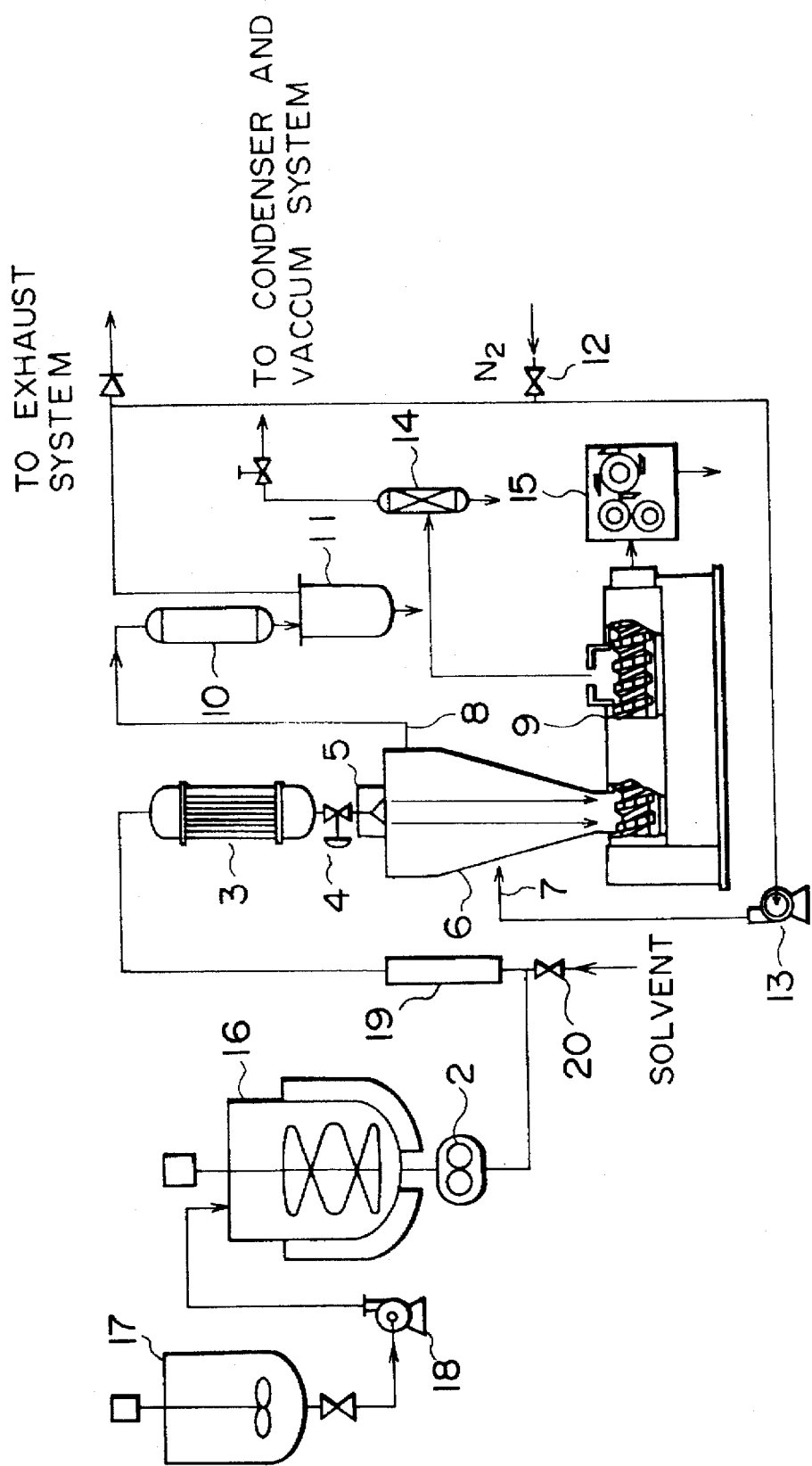
FIGS. 5 and 6 are each a schematic flow sheet of an embodiment in which methanol as a solvent is added to and mixed with a polymerization solution drawn in a polymer manufacturing process in accordance with a continuous bulk polymerization method.
Figure 6:
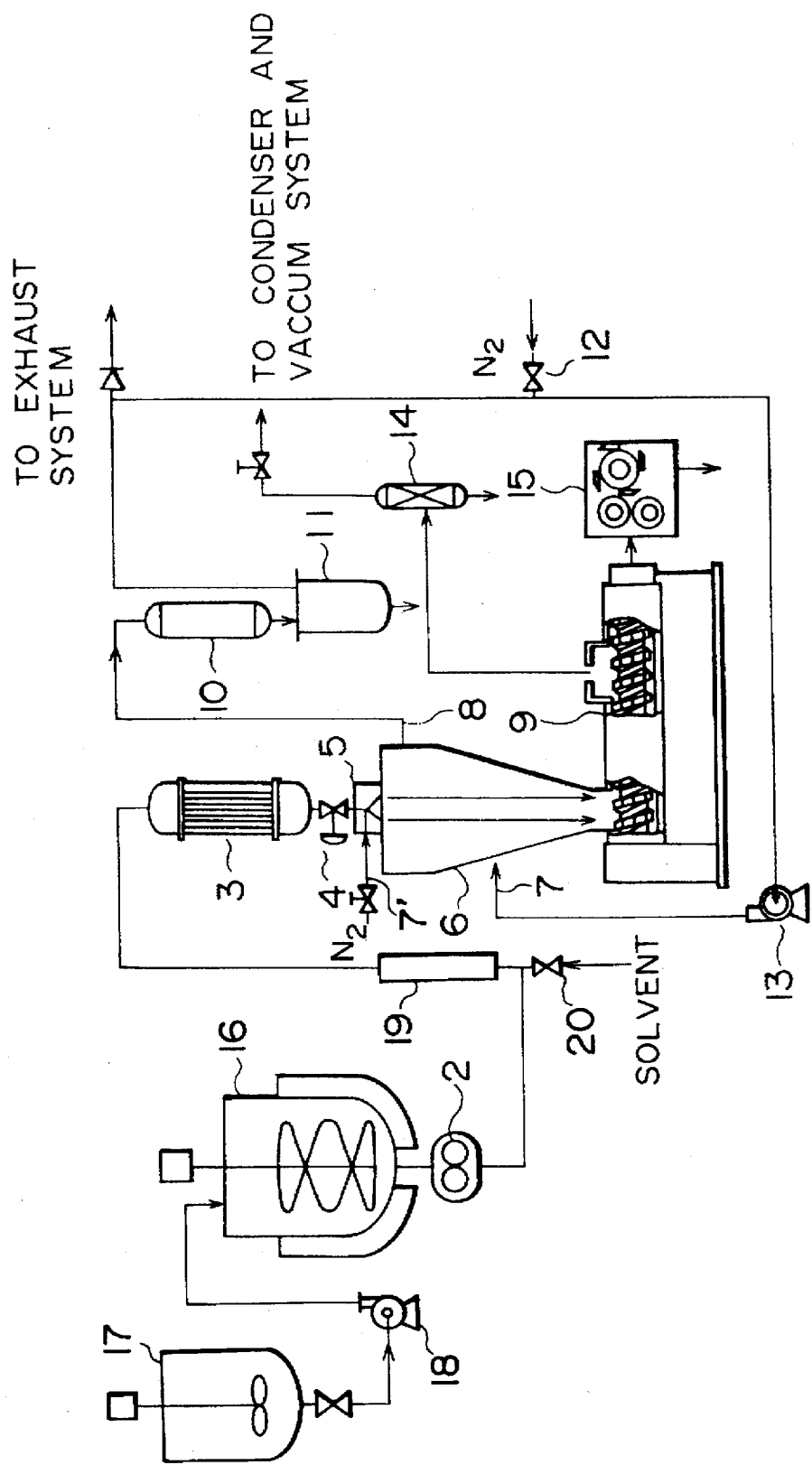

FIGS. 5 and 6 show embodiments in which methanol is added to and mixed with a polymerization solution drawn in a polymer manufacturing process in accordance with a continuous bulk polymerization method. In this case, as shown in FIGS. 3 and 4, monomer components, a polymerization initiator, a chain transfer agent and the like are blended in the blend tank 17 to prepare a material solution, and this material solution is then fed to the complete mixing polymerization reactor 16 at a constant flow rate by the metering pump 18, in which polymerization is carried out. Next, this polymerization liquid is drawn by the metering pump 2, and methanol is continuously added through an injection inlet 20 to the liquid polymerization product. After uniformly mixed in a mixer 19, the polymerization liquid is introduced into the heater 3, and it is then treated in the same manner as in FIGS. 1 and 2 to continuously prepare the polymer.

The temperature and the pressure in each section are changeable by an external heater and a pressure regulating valve, and the temperatures and the pressures of the polymer composition and the volatile components in each section are measured. The flow rate and the composition of the polymer composition to be fed are optionally changeable.

Figure 7:
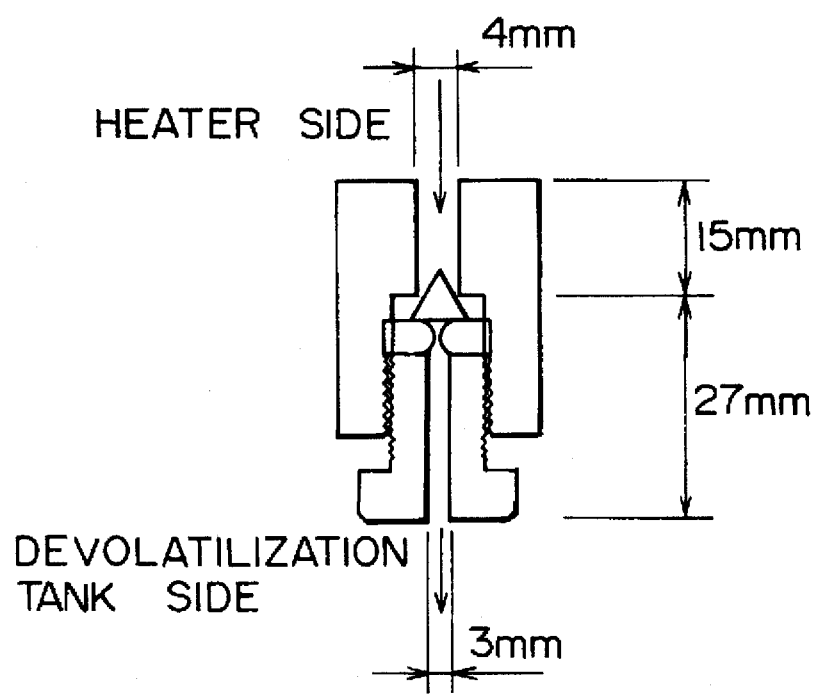
FIG. 7 shows a vent plug as one embodiment of a flush nozzle used.

FIG. 7 shows a vent plug as one example of the used flush nozzle.

According to the present invention, a polymer composition containing methanol is heated and pressurized, and then discharged into an atmosphere having a pressure in the vicinity of atmospheric pressure through a flush nozzle, so that while volatile components are separated, a polymer can be taken out, whereby the polymer can be easily separated and purified, thereby preparing the high-quality polymer without modification such as coloring. In addition, the present invention permits the improvement of a devolatilization efficiency and the stable operation of the device for a long period of time.

Next, the present invention will be described in more detail with reference to examples, but the scope of the present invention should not be limited to these examples. In the examples, "part(s)" and "%" all mean "part(s) by weight" and "% by weight", respectively.

In the following examples, physical properties of polymers were measured by the following procedures.

(1) volatile components contained in the polymer were analyzed by gas chromatography to determine their content.

(2) The total light transmission (%) of each molded article was measured in accordance with an ASTM D1003 method.

The specifications of main devices used in the examples are as follows.

Stirring tank and Polymerization tank: Diameter=207 mm, length=240 mm, bottom=half-ellipse mirror, net volume=6 liters, made of SUS 316, and equipped with a heating medium circulating jacket and a Max blend blade.

Metering pump for transfer: Iwaki LD-112 type, maximum discharge rate=70 cc/min, and discharge pressure=16 kgf/cm² (50 Hz).

Heater: Noritake Static Mixer N60, diameter of an outside pipe with jacket=¾ inch, that of an inside pipe=⅜ inch, and length=430 mm.

Tank: Upper cylinder: diameter=216 mm, and length=148 mm

Lower cone: diameters=216 mm and 70 mm, length=274 mm, and equipped with a jacket, a condenser and a storage tank.

Gear pump for drawing: Zenith HPB type, 1.75 cc/rev., max 100 rpm, inlet=⅜ inch, and outlet=¼ inch.

As flush nozzles, the following valves and dies were used.

(A) Vent plug: Opening diameter=3.0 mm, length=42 mm, and orifice diameter=4.0 mm.

(B) Diehead valve: 3 holes, opening diameter=3.0 mm, and orifice diameter=6.0 mm.

(C) Strand die: Single hole, opening diameter=2.5 mm, and length=20 mm.

(D) T-die: Fishtail type, width=25 mm, and space=1.5 mm.

(E) Circular die: Spider type, and diameters 18 mm and 20 mm.

Extruder: Single shaft, diameter=40 mm, L/D=29, and equipped with one front vent.

EXAMPLE 1

In this example, a system shown in FIG. 1 was used. First, 5 kg of a methacrylate polymer composition containing 60.0 parts of poly(methyl methacrylate), 25.6 parts of methyl methacrylate, 1.1 parts of methyl acrylate and 13.3 parts of methanol was placed in a stirring tank 1. Next, the composition was fed to a heater 3 at a flow rate of 1 kg/hr by a metering pump 2, while maintained at 150° C., and then discharged through a flush nozzle 5 (a vent plug) into a tank 6 of a nitrogen gas atmosphere. The polymer composition was heated up to 200° C. in the heater, and at this time, the pressure of the heater was 25 kg/cm². A generated vapor of volatile components was taken out through an exhaust opening 8 at an upper position of the tank, passed through a condenser 10 in which the volatile components were condensed, and then collected in a storage tank (a receiver) 11. In this case, the collection of the volatile components was done at 0.37 kg/hr in a ratio of 93% of a theoretical amount, and in the volatile components, there were contained 63% of methyl methacrylate, 2.5% of methyl acrylate and 32.5% of methanol. While a noncondensable gas was returned to the tank 6 by a blower 13 and then circulated through the system, and the pressure in the system was maintained at 0.9 to 1.1 atm.

The flushed polymer was cooled to about 80° C. in the tank 6, and then allowed to flow in a foaming strand state having an outer diameter of about 4 mm. In this polymer, there were contained 3.3% or methyl methacrylate, 0.14% of methyl acrylate and 0.03% of methanol as the remaining volatile components. This polymer was directly fed to the feed portion of a vent extruder 9 directly connected to the outlet of the tank 6, and the volatile components were further removed at a barrel temperature of 230° C. and a vent vacuum degree of 150 Torr. Afterward, the polymer was cut by a pelletizer 14 to obtain pellets of the polymer. The vapor of the volatile components exhausted through the vent opening of the vent extruder 9 was led into a distillation column 14, in which high-boiling components were separated and removed, and the monomer components were then collected by a condenser. The remaining volatile components in the obtained polymer were 0.22% of methyl methacrylate and 0.01% of methyl acrylate, and the content of methanol was less than detection limit. The concentration of the total volatile components was 0.23%. The polymer had a total light transmission of 93% and a good appearance, i.e., a colorless transparent appearance.

EXAMPLES 2 to 6

Polymer compositions having the same composition as in Example 1 were prepared and then subjected to a devolatilizing treatment under various conditions in a similar manner, and a vent extruder was used to obtain the pellets of polymers. Table 1 shows compositions of the polymer compositions, heating temperatures, feed rates, devolatilizing conditions, the remaining volatile components of the polymers obtained by a devolatilization and extrusion treatment, and total light transmissions.

EXAMPLES 7 to 10

Polymer compositions having the same composition as in Example 1 were prepared and then subjected to a devolatilizing treatment using various kinds of flush nozzles by the same procedures as in Example 1, and a vent extruder was used to obtain the pellets of polymers. The results are similarly shown in Table 2.

EXAMPLES 11 to 18

Polymer compositions having various compositions were prepared and then subjected to a devolatilizing treatment by the same procedures as in Example 1, and a vent extruder was used to obtain the pellets of polymers. The results are similarly shown in Tables 2 to 4.

COMPARATIVE EXAMPLE 1

A polymer composition containing 60 parts of poly (methyl methacrylate), 25.6 parts of methyl methacrylate, 1.1 parts of methyl acrylate and 13.3 parts of toluene was prepared by the use of the same system as in Example 1, and it was then fed to a heater 3 at a flow rate of 1 kg/hr, while maintained at 150° C.

Next, devolatilization was carried out under the same conditions as in Example 1, but at this time, the pressure in the heater 3 was 8 kg/cm². In a polymer separated in a strand state having an outer diameter of about 4 mm, there were contained 8.3% of methyl methacrylate, 0.35% of methyl acrylate and 6.3% of toluene, and the degree of foaming was low. Afterward, this polymer was similarly treated by an extruder, and the thus obtained polymer pellets contained 0.62% of methyl methacrylate, 0.03% of methyl acrylate and 0.65% of toluene. The concentration of the total volatile components was 1.3%.

COMPARATIVE EXAMPLE 2

A polymer composition containing 71 parts of poly (methyl methacrylate), 27.8 parts of methyl methacrylate and 1.2 parts of methyl acrylate was prepared by the use of the same system as in Example 1, and it was then fed to a heater 3 at a flow rate of 1 kg/hr, while maintained at 150° C. Next, devolatilization was carried out under the same conditions as in Example 1, but at this time, the pressure in the heater 3 was 7 kg/cm². In a polymer separated in a strand state having an outer diameter of about 4 mm, there were contained 8.5% of methyl methacrylate and 0.35% of methyl acrylate. Afterward, this polymer was similarly treated by an extruder, and the thus obtained polymer pellets contained 1.05% of methyl methacrylate and 0.04% of methyl acrylate. The concentration of the total volatile components was 1.09%.

REFERENCE EXAMPLE 1

Continuous solution polymerization was carried out by the use of a system shown in FIG. 3. In a blend tank 17, there were mixed 83.2 parts of methyl methacrylate, 3.5 parts of methyl acrylate, 13.3 parts of methanol, 0.01 parts of di-tert-amyl peroxide and 0.23 part of n-dodecyl mercaptan in a nitrogen atmosphere to prepare a material solution. Next, 4.6 kg of this material solution was placed in a polymerization tank 16, and it was sealed up. The material solution was heated up to 150° C. and polymerization was then continued until a monomer conversion and a polymer concentration reached 69% and 60%, respectively, and next, the material solution was continuously fed to the polymerization tank 16 at a flow rate of 1 kg/hr. A reaction temperature in the polymerization tank 16 was set to 150° C. and an average residence time was set to 4.6 hours, thereby preparing a polymer composition having a weight-average molecular weight of about 100,000 and containing 60 parts of poly(methyl methacrylate), 25.6 parts of methyl methacrylate, 1.1 parts of methyl acrylate and 13.3 parts of methanol.

EXAMPLE 19

In this example, a system shown in FIG. 3 was used. The polymer composition prepared in Reference Example 1 was continuously fed to a heater 3 at a flow rate of 1 kg/hr by the use of a metering pump 2, and devolatilization was then carried out under the same conditions as in Example 1. At this time, the internal pressure in the heater 3 was 25 kg/cm². In a polymer separated in a foaming strand state having an outer diameter of about 8 mm in the tank, there were contained 3.4% of methyl methacrylate, 0.14% of methyl acrylate and 0.03% of methanol as the remaining volatile components. Afterward, this polymer was treated under the same conditions as Example 1 by a vent extruder, and the remaining volatile components in the thus obtained polymer pellets were 0.36% of methyl methacrylate and 0.01% of methyl acrylate. The concentration of the total volatile components was 0.37%. The content of methanol was less than detection limit. The polymer had a total light transmission of 93% and a good appearance, i.e., a colorless transparent appearance.

REFERENCE EXAMPLE 2

Continuous bulk polymerization was carried out by the use of a system shown in FIG. 5. In a blend tank 17, there were mixed 96 parts of methyl methacrylate, 4 parts of methyl acrylate, 0.018 part of di-tert-butyl peroxide and 0.2 part of n-dodecyl mercaptan in a nitrogen atmosphere to prepare a material solution. Next, 4.6 kg of this material solution was placed in a polymerization tank 16, and it was sealed up. The material solution was heated up to 150° C. and polymerization was then continued until a monomer conversion reached 60%, and next, the material solution was continuously fed to the polymerization tank 16 at a flow rate of 1 kg/hr. A reaction temperature in the polymerization tank 16 was set to 150° C. and an average residence time was set to about 4.6 hours, thereby preparing a polymer composition having a weight-average molecular weight of about 100,000 and containing 60 parts of poly(methyl methacrylate), 38.4 parts of methyl methacrylate and 1.6 parts of methyl acrylate.

EXAMPLE 20

In this example, a system shown in FIG. 5 was used. The polymer composition prepared in Reference Example 2 was continuously drawn at a flow rate of 1 kg/hr by the use of a metering pump 2, and methanol was added at a flow rate of 0.153 kg/hr through an injection inlet 20 and it was uniformly mixed by a mixer 19 to prepare a polymer composition containing 52.0 parts of poly(methyl methacrylate), 33.3 parts of methyl methacrylate, 1.4 parts of methyl acrylate and 13.3 parts of methanol. This polymer composition was continuously fed to a heater 3 at a flow rate of 1.153 kg/hr, and devolatilization was then carried out under the same conditions as in Example 1. At this time, the internal pressure in the heater 3 was 24 kg/cm². In a polymer separated in a foaming strand state having an outer diameter of about 7 mm in the tank, there were contained 4.1% of methyl methacrylate, 0.17% of methyl acrylate and 0.03% of methanol as the remaining volatile components. Afterward, this polymer was treated under the same conditions as Example 1 by a vent extruder, and the remaining volatile components in the thus obtained polymer pellets were 0.35% of methyl methacrylate and 0.01% of methyl acrylate. The concentration of the total volatile components was 0.36%. The content of methanol was less than detection limit. The polymer had a total light transmission of 93% and a good appearance, i.e., a colorless transparent appearance.

Incidentally, abbreviations in Tables 1 to 8 have the following meanings.

MMA: Methyl methacrylate

MA: Methyl acrylate

ME: Methanol

EA: Ethyl acrylate

BA: n-butyl acrylate

ST: Styrene

TOL: Toluene

ND: Less than the detection limit (0.01%) of gas chromatography.

TABLE 1

|  | Example 1 | Example 2 | Example 3 |
| --- | --- | --- | --- |
| Comonomer used | MA | MA | MA |
| Its ratio in polymer (%) | 4 | 4 | 4 |
| Solvent used | ME | ME | ME |
| Composition of polymer composition fed (%) | | | |
| Polymer | 60.0 | 60.0 | 60.0 |
| MMA | 25.6 | 25.6 | 25.6 |
| Comonomer | 1.1 | 1.1 | 1.1 |
| Solvent | 13.3 | 13.3 | 13.3 |
| Temp. of polymer composition at feed (°C.) | 150 | 150 | 150 |
| Feed rate of polymer composition (kg/hr) | 1.0 | 1.0 | 1.0 |

TABLE 1-continued

|  | | | |
|---|---|---|---|
| Temp. at outlet of heater (°C.) | 200 | 200 | 200 |
| Internal pressure of heater (kg/cm²G) | 25 | 35 | 23 |
| Flush nozzle used | (A) | (A) | (A) |
| Internal pressure of tank (kg/cm²G) | 0.0 | 0.0 | 0.2 |
| Remaining volatile components after devolatilization (%) | | | |
| MMA | 3.30 | 3.60 | 5.10 |
| Comonomer | 0.14 | 0.15 | 0.21 |
| Solvent | 0.03 | 0.02 | 0.03 |
| Temp. of extruder barrel (°C.) | 230 | 230 | 230 |
| Vacuum degree in vent of extruder (Torr) | 150 | 150 | 150 |
| Remaining volatile components in extruded pellet (%) | | | |
| MMA | 0.22 | 0.24 | 0.34 |
| Comonomer | 0.01 | 0.01 | 0.01 |
| Solvent | ND | ND | ND |
| Total light transmission (%) | 93 | 93 | 93 |

|  | Example 4 | Example 5 | Example 6 |
|---|---|---|---|
| Comonomer used | MA | MA | MA |
| Its ratio in polymer (%) | 4 | 4 | 4 |
| Solvent used | ME | ME | ME |
| Composition of polymer composition fed (%) | | | |
| Polymer | 60.0 | 60.0 | 60.0 |
| MMA | 25.6 | 25.6 | 25.6 |
| Comonomer | 1.1 | 1.1 | 1.1 |
| Solvent | 13.3 | 13.3 | 13.3 |
| Temp. of polymer composition at feed (°C.) | 150 | 150 | 150 |
| Feed rate of polymer composition (kg/hr) | 1.0 | 1.0 | 1.0 |
| Temp. at outlet of heater (°C.) | 200 | 180 | 220 |
| Internal pressure of heater (kg/cm²G) | 20 | 20 | 30 |
| Flush nozzle used | (A) | (A) | (A) |
| Internal pressure of tank (kg/cm²G) | 0/4 | 0.0 | 0.0 |
| Remaining volatile components after devolatilization (%) | | | |
| MMA | 1.80 | 4.00 | 2.20 |
| Comonomer | 0.08 | 0.17 | 0.09 |
| Solvent | 0.03 | 0.03 | 0.03 |
| Temp. of extruder barrel (°C.) | 230 | 230 | 230 |
| Vacuum degree in vent of extruder (Torr) | 150 | 150 | 150 |
| Remaining volatile components in extruded pellet (%) | | | |
| MMA | 0.12 | 0.27 | 0.15 |
| Comonomer | 0.01 | 0.01 | 0.01 |
| Solvent | ND | ND | ND |
| Total light transmission (%) | 93 | 93 | 93 |

TABLE 2

|  | Example 7 | Example 8 | Example 9 |
|---|---|---|---|
| Comonomer used | MA | MA | MA |
| Its ratio in polymer (%) | 4 | 4 | 4 |
| Solvent used | ME | ME | ME |
| Composition of polymer composition fed (%) | | | |
| Polymer | 60.0 | 60.0 | 60.0 |
| MMA | 25.6 | 25.6 | 25.6 |
| Comonomer | 1.1 | 1.1 | 1.1 |
| Solvent | 13.3 | 13.3 | 13.3 |
| Temp. of polymer composition at feed (°C.) | 150 | 150 | 150 |
| Feed rate of polymer composition (kg/hr) | 1.0 | 1.0 | 1.0 |

TABLE 2-continued

|  | | | |
|---|---|---|---|
| Temp. at outlet of heater (°C.) | 200 | 200 | 200 |
| Internal pressure at inlet of heater (kg/cm²) | 26 | 20 | 25 |
| Flush nozzle used | (B) | (C) | (D) |
| Internal pressure of tank (atm) | 1.0 | 1.0 | 1.0 |
| Remaining volatile components after devolatilization (%) | | | |
| MMA | 3.20 | 3.50 | 3.40 |
| Comonomer | 0.13 | 0.15 | 0.14 |
| Solvent | 0.03 | 0.02 | 0.02 |
| Temp. of extruder barrel (°C.) | 230 | 230 | 230 |
| Vacuum degree in vent of extruder (Torr) | 150 | 150 | 150 |
| Remaining volatile components in extruded pellet (%) | | | |
| MMA | 0.21 | 0.23 | 0.23 |
| Comonomer | 0.01 | 0.01 | 0.01 |
| Solvent | ND | ND | ND |
| Total light transmission (%) | 93 | 93 | 93 |

|  | Example 10 | Example 11 | Example 12 |
|---|---|---|---|
| Comonomer used | MA | MA | MA |
| Its ratio in polymer (%) | 4 | 4 | 4 |
| Solvent used | ME | ME | ME |
| Composition of polymer composition fed (%) | | | |
| Polymer | 60.0 | 50.0 | 70.0 |
| MMA | 25.6 | 35.2 | 20.5 |
| Comonomer | 1.1 | 1.5 | 0.9 |
| Solvent | 13.3 | 13.3 | 8.6 |
| Temp. of polymer composition at feed (°C.) | 150 | 150 | 150 |
| Feed rate of polymer composition (kg/hr) | 1.0 | 1.0 | 1.0 |
| Temp. at outlet of heater (°C.) | 200 | 200 | 200 |
| Internal pressure of heater (kg/cm²G) | 25 | 27 | 15 |
| Flush nozzle used | (E) | (A) | (A) |
| Internal pressure of tank (kg/cm²G) | 0.0 | 0.0 | 0.0 |
| Remaining volatile components after devolatilization (%) | | | |
| MMA | 2.60 | 5.20 | 2.10 |
| Comonomer | 0.11 | 0.22 | 0.09 |
| Solvent | 0.01 | 0.03 | 0.03 |
| Temp. of extruder barrel (°C.) | 230 | 230 | 230 |
| Vacuum degree in vent of extruder (Torr) | 150 | 150 | 150 |
| Remaining volatile components in extruded pellet (%) | | | |
| MMA | 0.17 | 0.35 | 0.14 |
| Comonomer | 0.01 | 0.01 | 0.01 |
| Solvent | ND | ND | ND |
| Total light transmission (%) | 93 | 93 | 93 |

TABLE 3

|  | Example 13 | Example 14 | Example 15 |
|---|---|---|---|
| Comonomer used | MA | MA | MA |
| Its ratio in polymer (%) | 4 | 9 | 13 |
| Solvent used | ME | ME | ME |
| Composition of polymer composition fed (%) | | | |
| Polymer | 40.6 | 60.0 | 60.0 |
| MMA | 28.2 | 24.3 | 23.2 |
| Comonomer | 1.2 | 2.4 | 3.5 |
| Solvent | 30.0 | 13.3 | 13.3 |
| Temp. of polymer composition at feed (°C.) | 150 | 150 | 150 |
| Feed rate of polymer composition (kg/hr) | 1.0 | 1.0 | 1.0 |

TABLE 3-continued

| | | | |
|---|---|---|---|
| Temp. at outlet of heater (°C.) | 200 | 200 | 200 |
| Internal pressure of heater (kg/cm²G) | 30 | 25 | 26 |
| Flush nozzle used | (A) | (A) | (A) |
| Internal pressure of tank (kg/cm²G) | 0.0 | 0.0 | 0.0 |
| Remaining volatile components after devolatilization (%) | | | |
| MMA | 1.50 | 3.40 | 3.20 |
| Comonomer | 0.06 | 0.34 | 0.48 |
| Solvent | 0.03 | 0.02 | 0.03 |
| Temp. of extruder barrel (°C.) | 230 | 210 | 180 |
| Vacuum degree in vent of extruder (Torr) | 200 | 150 | 150 |
| Remaining volatile components in extruded pellet (%) | | | |
| MMA | 0.32 | 0.30 | 0.33 |
| Comonomer | 0.01 | 0.01 | 0.08 |
| Solvent | ND | ND | ND |
| Total light transmission (%) | 93 | 93 | 93 |

| | Example 16 | Example 17 |
|---|---|---|
| Comonomer used | EA | BA |
| Its ratio in polymer (%) | 4 | 4 |
| Solvent used | ME | ME |
| Composition of polymer composition fed (%) | | |
| Polymer | 60.0 | 60.0 |
| MMA | 35.6 | 25.6 |
| Comonomer | 1.1 | 1.1 |
| Solvent | 13.3 | 13.3 |
| Temp. of polymer composition at feed (°C.) | 150 | 150 |
| Feed rate of polymer composition (kg/hr) | 1.0 | 1.0 |
| Temp. at outlet of heater (°C.) | 200 | 200 |
| Internal pressure of heater (kg/cm²G) | 25 | 25 |
| Flush nozzle used | (A) | (A) |
| Internal pressure tank (kg/cm²G) | 0.0 | 0.0 |
| Remaining volatile components after devolatilization (%) | | |
| MMA | 1.20 | 1.00 |
| Comonomer | 0.05 | 0.04 |
| Solvent | 0.03 | 0.03 |
| Temp. of extruder barrel (°C.) | 230 | 230 |
| Vacuum degree in vent of extruder (Torr) | 150 | 150 |
| Remaining volatile components in extruded pellet (%) | | |
| MMA | 0.34 | 0.32 |
| Comonomer | 0.08 | 0.08 |
| Solvent | ND | ND |
| Total light transmission (%) | 93 | 93 |

TABLE 4

| | Example 18 | Example 19 | Example 20 |
|---|---|---|---|
| Comonomer used | ST | MA | MA |
| Its ratio in polymer (%) | 20 | 4 | 4 |
| Solvent used | ME | ME | ME |
| Composition of polymer composition fed (%) | | | |
| Polymer | 50.3 | 60.0 | 60.0 |
| MMA | 29.1 | 25.6 | 25.6 |
| Comonomer | 7.3 | 1.1 | 1.1 |
| Solvent | 13.3 | 13.3 | 13.3 |
| Temp. of polymer composition at feed (°C.) | 150 | 150 | 150 |
| Feed rate of polymer composition (kg/hr) | 1.0 | 1.0 | 1.0 |
| Temp. at outlet of heater (°C.) | 200 | 200 | 200 |
| Internal pressure of heater (kg/cm²G) | 25 | 25 | 24 |
| Flush nozzle used | (A) | (A) | (A) |
| Internal pressure tank (kg/cm²G) | 0.0 | 0.0 | 0.0 |
| Remaining volatile components after devolatilization (%) | | | |
| MMA | 4.10 | 3.40 | 4.10 |
| Comonomer | 1.03 | 0.14 | 0.17 |
| Solvent | 0.03 | 0.03 | 0.03 |
| Temp. of extruder barrel (°C.) | 220 | 230 | 230 |
| Vacuum degree in vent of extruder (Torr) | 150 | 150 | 150 |
| Remaining volatile components in extruded pellet (%) | | | |
| MMA | 0.32 | 0.36 | 0.35 |
| Comonomer | 0.08 | 0.02 | 0.01 |
| Solvent | ND | ND | ND |
| Total light transmission (%) | 93 | 93 | 93 |

| | Comp. Ex. 1 | Comp. Ex. 2 |
|---|---|---|
| Comonomer used | MA | MA |
| Its ratio in polymer (%) | 4 | 4 |
| Solvent used | TOL | ME |
| Composition of polymer composition fed (%) | | |
| Polymer | 60.0 | 71.0 |
| MMA | 25.6 | 27.8 |
| Comonomer | 1.1 | 1.2 |
| Solvent | 13.3 | 0.0 |
| Temp. of polymer composition at feed (°C.) | 150 | 150 |
| Feed rate of polymer composition (kg/hr) | 1.0 | 1.0 |
| Temp. at outlet of heater (°C.) | 200 | 200 |
| Internal pressure of heater (kg/cm²G) | 8 | 7 |
| Flush nozzle used | (A) | (A) |
| Internal pressure tank (kg/cm²G) | 0.0 | 0.0 |
| Remaining volatile components after devolatilization (%) | | |
| MMA | 8.30 | 8.50 |
| Comonomer | 0.35 | 0.35 |
| Solvent | 6.30 | 0.05 |
| Temp. of extruder barrel (°C.) | 230 | 230 |
| Vacuum degree in vent of extruder (Torr) | 150 | 150 |
| Remaining volatile components in extruded pellet (%) | | |
| MMA | 0.62 | 1.05 |
| Comonomer | 0.03 | 0.04 |
| Solvent | 0.65 | ND |
| Total light transmission (%) | 93 | 93 |

EXAMPLE 21

In this example, a system shown in FIG. 1 was used. First, 5 kg of a polymer composition containing 60.0 parts of poly(methyl methacrylate), 25.6 parts of methyl methacrylate, 1.1 parts of methyl acrylate and 13.3 parts of methanol was placed in a stirring tank 1. Next, the composition was fed to a heater 3 at a flow rate of 1 kg/hr by a metering pump 2, while maintained at 150° C., and then discharged through a flush nozzle 5 (a vent plug) into a tank 6 of a nitrogen gas atmosphere. At this time, a nitrogen gas was introduced at a flow rate of 0.6 l/min into the tank 6 through an inert gas inlet 7' immediately in front of the flush nozzle 5. The polymer composition was heated up to 180° C. in the heater, and at this time, the pressure of the heater was 25 kg/cm². A generated vapor of volatile components was taken out through an exhaust opening 8 at an upper position of the tank, passed through a condenser 10 in which the volatile components were condensed, and then collected in a storage tank (a receiver) 11. In this case, the collection of the volatile components was done at 0.37 kg/hr in a ratio of 93% of a theoretical amount, and in the volatile components, there were contained 63% of methyl methacrylate, 2.5% of methyl acrylate and 32.5% of methanol. While a noncondensable gas was returned to the tank 6 by a blower 13 and then circulated through the system, and the pressure in the system was maintained at 0.9 to 1.1 atm by exhausting an excessive gas.

The flushed polymer was cooled to about 80° C. in the tank 6, and then allowed to flow down in a foaming strand state having an outer diameter of about 8 mm. In this polymer, there were contained 3.3% or methyl methacrylate, 0.17% of methyl acrylate and 0.03% of methanol as the remaining volatile components. This polymer was directly fed to the feed portion of a vent extruder 9 directly connected to the outlet of the tank 6, and the volatile components were further removed at a barrel temperature of 230° C. and a vent vacuum degree of 150 Torr. Afterward, the polymer was cut by a pelletizer 14 to obtain pellets of the polymer. The vapor of the volatile components exhausted through the vent opening of the vent extruder 9 was led into a distillation column 14, in which high-boiling components were separated and removed, and the monomer components were then collected by a condenser. The remaining volatile components in the obtained polymer were 0.22% of methyl methacrylate and 0.01% of methyl acrylate, and the content of methanol was less than detection limit. The concentration of the total volatile components was 0.23%. The polymer had a total light transmission of 93% and a good appearance, i.e., a colorless transparent appearance.

EXAMPLES 22 to 26

Polymer compositions having the same composition as in Example 21 were prepared and then subjected to a devolatilizing treatment in a similar manner under various conditions where a heating temperature and the amount of an inert gas to be introduced were changed, and a vent extruder was used to obtain the pellets of polymers. Table 5 shows compositions of the polymer compositions, heating temperatures, feed rates, devolatilizing conditions, the remaining volatile components of the polymers obtained by a devolatilization and extrusion treatment, and total light transmissions.

EXAMPLES 27 to 30

Polymer compositions having the same composition as in Example 21 were prepared and then subjected to a devolatilizing treatment using various kinds of flush nozzles by the same procedures as in Example 21, and a vent extruder was used to obtain the pellets of polymers. The results are similarly shown in Table 6.

EXAMPLES 31 to 38

Polymer compositions having various compositions were prepared and then subjected to a devolatilizing treatment by the same procedures as in Example 21, and a vent extruder was used to obtain the pellets of polymers. The results are similarly shown in Tables 6 to 8.

COMPARATIVE EXAMPLE 3

A polymer composition containing 60 parts of poly(methyl methacrylate), 25.6 parts of methyl methacrylate, 1.1 parts of methyl acrylate and 13.3 parts of toluene was prepared by the use of the same system as in Example 21, and it was then fed to a heater 3 at a flow rate of 1 kg/hr, while maintained at 150° C.

Next, devolatilization was carried out under the same conditions as in Example 21, but at this time, the pressure in the heater 3 was 9 kg/cm². In a polymer separated in a strand state having an outer diameter of about 4 mm, there were contained 7.3% of methyl methacrylate, 0.37% of methyl acrylate and 6.3% of toluene, and the degree of foaming was low. Afterward, this polymer was similarly treated by an extruder, and the thus obtained polymer pellets contained 0.55% of methyl methacrylate, 0.03% of methyl acrylate and 0.63% of toluene. The concentration of the total volatile components was 1.21%.

REFERENCE EXAMPLE 3

Continuous solution polymerization was carried out by the use of a system shown in FIG. 4. In a blend tank 17, there were mixed 83.2 parts of methyl methacrylate, 3.5 parts of methyl acrylate, 13.3 parts of methanol, 0.01 parts of di-tert-amyl peroxide and 0.23 part of n-dodecyl mercaptan in a nitrogen atmosphere to prepare a material solution. Next, 4.6 kg of this material solution was placed in a polymerization tank 16, and it was sealed up. The material solution was heated up to 150° C. and polymerization was then continued until a monomer conversion and a polymer concentration reached 69% and 60%, respectively, and next, the material solution was continuously fed to the polymerization tank 16 at a flow rate of 1 kg/hr. A reaction temperature in the polymerization tank 16 was set to 150° C. and an average residence time was set to 4.6 hours, thereby preparing a polymer composition having a weight-average molecular weight of about 100,000 and containing 60 parts of poly(methyl methacrylate), 25.6 parts of methyl methacrylate, 1.1 parts of methyl acrylate and 13.3 parts of methanol.

EXAMPLE 39

In this example, a system shown in FIG. 4 was used. The polymer composition prepared in Reference Example 3 was continuously fed to a heater 3 at a flow rate of 1 kg/hr by the use of a metering pump 2, and devolatilization was then carried out under the same conditions as in Example 21. At this time, the internal pressure in the heater 3 was 25 kg/cm². In a polymer separated in a foaming strand state having an outer diameter of about 8 mm in the tank, there were contained 1.1% of methyl methacrylate, 0.05% of methyl acrylate and 0.03% of methanol as the remaining volatile components. Afterward, this polymer was treated under the same conditions as Example 21 by a vent extruder, and the remaining volatile components in the thus obtained polymer pellets were 0.33% of methyl methacrylate and 0.01% of methyl acrylate. The concentration of the total volatile components was 0.34%. The content of methanol was less than detection limit. The polymer had a total light transmission of 93% and a good appearance, i.e., a colorless transparent appearance.

REFERENCE EXAMPLE 4

Continuous bulk polymerization was carried out by the use of a system shown in FIG. 6. In a blend tank 17, there were mixed 95 parts of methyl methacrylate, 5 parts of methyl acrylate, 0.018 part of di-tert-butyl peroxide and 0.2 part of n-dodecyl mercaptan in a nitrogen atmosphere to prepare a material solution. Next, 4.6 kg of this material solution was placed in a polymerization tank 16, and it was sealed up. The material solution was heated up to 150° C. and polymerization was then continued until a monomer conversion reached 60%, and next, the material solution was continuously fed to the polymerization tank 16 at a flow rate of 1 kg/hr. A reaction temperature in the polymerization tank 16 was set to 150° C. and an average residence time was set to about 4.6 hours, thereby preparing a polymer composition having a weight-average molecular weight of about 100,000 and containing 60 parts of poly(methyl methacrylate), 38.4 parts of methyl methacrylate and 1.6 parts of methyl acrylate.

EXAMPLE 40

In this example, a system shown in FIG. 6 was used. The polymer composition prepared in Reference Example 4 was continuously drawn at a flow rate of 1 kg/hr by the use of a metering pump 2, and methanol was added at a flow rate of 0.153 kg/hr through an injection inlet 20 and it was uniformly mixed by a mixer 19 to prepare a polymer composition containing 52.0 parts of poly(methyl methacrylate), 33.3 parts of methyl methacrylate, 1.4 parts of methyl acrylate and 13.3 parts of methanol. This polymer composition was continuously fed to a heater 3 at a flow rate of 1.153 kg/hr, and devolatilization was then carried out under the same conditions as in Example 21. At this time, the internal pressure in the heater 3 was 28 kg/cm². In a polymer separated in a foaming strand state having an outer diameter of about 7 mm in the tank, there were contained 4.1% of methyl methacrylate, 0.05% of methyl acrylate and 0.03% of methanol as the remaining volatile components. Afterward, this polymer was treated under the same conditions as Example 21 by a vent extruder, and the remaining volatile components in the thus obtained polymer pellets were 0.33% of methyl methacrylate and 0.01% of methyl acrylate. The concentration of the total volatile components was 0.34%. The content of methanol was less than detection limit. The polymer had a total light transmission of 93% and a good appearance, i.e., a colorless transparent appearance.

TABLE 5

| | Example 21 | Example 22 | Example 23 |
|---|---|---|---|
| Comonomer used | MA | MA | MA |
| Its ratio in polymer (%) | 4 | 4 | 4 |
| Solvent used | ME | ME | ME |
| Composition of polymer composition fed (%) | | | |
| Polymer | 60.0 | 60.0 | 60.0 |
| MMA | 25.6 | 25.6 | 25.6 |
| Comonomer | 1.1 | 1.1 | 1.1 |
| Solvent | 13.3 | 13.3 | 13.3 |
| Temp. of polymer composition at feed (°C.) | 150 | 150 | 150 |
| Feed rate of polymer composition (kg/hr) | 1.0 | 1.0 | 1.0 |
| Temp. at outlet of heater (°C.) | 180 | 180 | 180 |
| Internal pressure of heater (kg/cm²G) | 25 | 30 | 23 |
| Flush nozzle used | (A) | (A) | (A) |
| Amount of introduced inert gas (l/min) | 0.6 | 1.0 | 0.1 |
| Internal pressure of tank (kg/cm²G) | 0.0 | 0.0 | 0.0 |
| Remaining volatile components after devolatilization (%) | | | |
| MMA | 3.30 | 2.20 | 5.10 |
| Comonomer | 0.14 | 0.09 | 0.21 |
| Solvent | 0.03 | 0.02 | 0.03 |
| Temp. of extruder barrel (°C.) | 230 | 230 | 230 |
| Vacuum degree in vent of extruder (Torr) | 150 | 150 | 150 |
| Remaining volatile components in extruded pellet (%) | | | |
| MMA | 0.22 | 0.15 | 0.34 |
| Comonomer | 0.01 | 0.01 | 0.01 |
| Solvent | ND | ND | ND |
| Total light transmission (%) | 93 | 93 | 93 |

| | Example 24 | Example 25 | Example 26 |
|---|---|---|---|
| Comonomer used | MA | MA | MA |
| Its ratio in polymer (%) | 4 | 4 | 4 |
| Solvent used | ME | ME | ME |
| Composition of polymer composition fed (%) | | | |
| Polymer | 60.0 | 60.0 | 60.0 |
| MMA | 25.6 | 25.6 | 25.6 |
| Comonomer | 1.1 | 1.1 | 1.1 |
| Solvent | 13.3 | 13.3 | 13.3 |
| Temp. of polymer composition at feed (°C.) | 150 | 150 | 150 |
| Feed rate of polymer composition (kg/hr) | 1.0 | 1.0 | 1.0 |
| Temp. at outlet of heater (°C.) | 180 | 160 | 200 |
| Internal pressure of heater (kg/cm²G) | 25 | 20 | 30 |
| Flush nozzle used | (A) | (A) | (A) |
| Amount of introduced inert gas (l/min) | 0.6 | 0.6 | 0.6 |
| Internal pressure of tank (kg/cm²G) | 0.2 | 0.0 | 0.0 |
| Remaining volatile components after devolatilization (%) | | | |
| MMA | 2.90 | 4.00 | 2.20 |
| Comonomer | 0.12 | 0.17 | 0.09 |
| Solvent | 0.03 | 0.03 | 0.03 |
| Temp. of extruder barrel (°C.) | 230 | 230 | 230 |
| Vacuum degree in vent of extruder (Torr) | 150 | 150 | 150 |
| Remaining volatile components in extruded pellet (%) | | | |
| MMA | 0.19 | 0.27 | 0.15 |
| Comonomer | 0.01 | 0.01 | 0.01 |
| Solvent | ND | ND | ND |
| Total light transmission (%) | 93 | 93 | 93 |

TABLE 6

| | Example 27 | Example 28 | Example 29 |
|---|---|---|---|
| Comonomer used | MA | MA | MA |
| Its ratio in polymer (%) | 4 | 4 | 4 |
| Solvent used | ME | ME | ME |
| Composition of polymer composition fed (%) | | | |
| Polymer | 60.0 | 60.0 | 60.0 |
| MMA | 25.6 | 25.6 | 25.6 |
| Comonomer | 1.1 | 1.1 | 1.1 |
| Solvent | 13.3 | 13.3 | 13.3 |
| Temp. of polymer composition at feed (°C.) | 150 | 150 | 150 |
| Feed rate of polymer composition (kg/hr) | 1.0 | 1.0 | 1.0 |
| Temp. at outlet of heater (°C.) | 180 | 180 | 180 |
| Internal pressure of heater (kg/cm²G) | 26 | 25 | 25 |
| Flush nozzle used | (B) | (C) | (D) |
| Amount of introduced inert gas (l/min) | 0.6 | 0.6 | 0.6 |
| Internal pressure of tank (kg/cm²G) | 0.0 | 0.0 | 0.0 |

TABLE 6-continued

Remaining volatile components after devolatilization (%)

| | | | |
|---|---|---|---|
| MMA | 3.40 | 3.10 | 2.90 |
| Comonomer | 0.14 | 0.13 | 0.12 |
| Solvent | 0.03 | 0.02 | 0.02 |
| Temp. of extruder barrel (°C.) | 230 | 230 | 230 |
| Vacuum degree in vent of extruder (Torr) | 150 | 150 | 150 |

Remaining volatile components in extruded pellet (%)

| | | | |
|---|---|---|---|
| MMA | 0.23 | 0.21 | 0.19 |
| Comonomer | 0.01 | 0.01 | 0.01 |
| Solvent | ND | ND | ND |
| Total light transmission (%) | 93 | 93 | 93 |

| | Example 30 | Example 31 | Example 32 |
|---|---|---|---|
| Comonomer used | MA | MA | MA |
| Its ratio in polymer (%) | 4 | 4 | 4 |
| Solvent used | ME | ME | ME |

Composition of polymer composition fed (%)

| | | | |
|---|---|---|---|
| Polymer | 60.0 | 50.0 | 70.0 |
| MMA | 25.6 | 35.2 | 20.5 |
| Comonomer | 1.1 | 1.5 | 0.9 |
| Solvent | 13.3 | 13.3 | 8.6 |
| Temp. of polymer composition at feed (°C.) | 150 | 150 | 150 |
| Feed rate of polymer composition (kg/hr) | 1.0 | 1.0 | 1.0 |
| Temp. at outlet of heater (°C.) | 180 | 180 | 180 |
| Internal pressure of heater (kg/cm$^2$G) | 25 | 27 | 15 |
| Flush nozzle used | (E) | (A) | (A) |
| Amount of introduced inert gas (l/min) | 0.6 | 0.6 | 0.6 |
| Internal pressure of tank (kg/cm$^2$G) | 0.0 | 0.0 | 0.0 |

Remaining volatile components after devolatilization (%)

| | | | |
|---|---|---|---|
| MMA | 2.60 | 5.20 | 2.10 |
| Comonomer | 0.11 | 0.22 | 0.09 |
| Solvent | 0.01 | 0.03 | 0.03 |
| Temp. of extruder barrel (°C.) | 230 | 230 | 230 |
| Vacuum degree in vent of extruder (Torr) | 150 | 150 | 150 |

Remaining volatile components in extruded pellet (%)

| | | | |
|---|---|---|---|
| MMA | 0.17 | 0.35 | 0.14 |
| Comonomer | 0.01 | 0.01 | 0.01 |
| Solvent | ND | ND | ND |
| Total light transmission (%) | 93 | 93 | 93 |

TABLE 7

| | Example 33 | Example 34 | Example 35 |
|---|---|---|---|
| Comonomer used | MA | MA | MA |
| Its ratio in polymer (%) | 4 | 9 | 13 |
| Solvent used | ME | ME | ME |

Composition of polymer composition fed (%)

| | | | |
|---|---|---|---|
| Polymer | 40.6 | 60.0 | 60.0 |
| MMA | 28.2 | 24.3 | 23.2 |
| Comonomer | 1.2 | 2.4 | 3.5 |
| Solvent | 30.0 | 13.3 | 13.3 |
| Temp. of polymer composition at feed (°C.) | 150 | 150 | 150 |
| Feed rate of polymer composition (kg/hr) | 1.0 | 1.0 | 1.0 |
| Temp. at outlet of heater (°C.) | 180 | 180 | 180 |
| Internal pressure of heater (kg/cm$^2$G) | 30 | 25 | 26 |

TABLE 7-continued

| | | | |
|---|---|---|---|
| Flush nozzle used | (A) | (A) | (A) |
| Amount of introduced inert gas (l/min) | 0.6 | 0.6 | 0.6 |
| Internal pressure of tank (kg/cm$^2$G) | 0.0 | 0.0 | 0.0 |

Remaining volatile components after devolatilization (%)

| | | | |
|---|---|---|---|
| MMA | 1.50 | 3.40 | 3.20 |
| Comonomer | 0.06 | 0.34 | 0.48 |
| Solvent | 0.03 | 0.02 | 0.03 |
| Temp. of extruder barrel (°C.) | 230 | 210 | 180 |
| Vacuum degree in vent of extruder (Torr) | 200 | 150 | 150 |

Remaining volatile components in extruded pellet (%)

| | | | |
|---|---|---|---|
| MMA | 0.32 | 0.30 | 0.33 |
| Comonomer | 0.01 | 0.01 | 0.08 |
| Solvent | ND | ND | ND |
| Total light transmission (%) | 93 | 93 | 93 |

| | Example 37 | Example 36 | Example 37 |
|---|---|---|---|
| Comonomer used | MA | EA | BA |
| Its ratio in polymer (%) | 4 | 4 | 4 |
| Solvent used | AC | ME | ME |

Composition of polymer composition fed (%)

| | | | |
|---|---|---|---|
| Polymer | 60.0 | 60.0 | 60.0 |
| MMA | 25.6 | 25.6 | 25.6 |
| Comonomer | 1.1 | 1.1 | 1.1 |
| Solvent | 13.3 | 13.3 | 13.3 |
| Temp. of polymer composition at feed (°C.) | 150 | 150 | 150 |
| Feed rate of polymer composition (kg/hr) | 1.0 | 1.0 | 1.0 |
| Temp. at outlet of heater (°C.) | 180 | 160 | 180 |
| Internal pressure of heater (kg/cm$^2$G) | 20 | 25 | 25 |
| Flush nozzle used | (A) | (A) | (A) |
| Amount of introduced inert gas (l/min) | 0.6 | 0.6 | 0.6 |
| Internal pressure of tank (kg/cm$^2$G) | 1.0 | 0.0 | 0.0 |

Remaining volatile components after devolatilization (%)

| | | | |
|---|---|---|---|
| MMA | 3.60 | 1.20 | 1.00 |
| Comonomer | 0.15 | 0.05 | 0.04 |
| Solvent | 0.03 | 0.03 | 0.03 |
| Temp. of extruder barrel (°C.) | 230 | 230 | 230 |
| Vacuum degree in vent of extruder (Torr) | 150 | 150 | 150 |

Remaining volatile components in extruded pellet (%)

| | | | |
|---|---|---|---|
| MMA | 0.31 | 0.34 | 0.32 |
| Comonomer | 0.08 | 0.08 | 0.08 |
| Solvent | ND | ND | ND |
| Total light transmission (%) | 93 | 93 | 93 |

TABLE 8

| | Example 38 | Example 39 | Example 40 | Comp. Ex. 3 |
|---|---|---|---|---|
| Comonomer used | ST | MA | MA | MA |
| Its ratio in polymer (%) | 20 | 4 | 4 | 4 |
| Solvent used | ME | ME | ME | TOL |

TABLE 8-continued

| | Example 38 | Example 39 | Example 40 | Comp. Ex. 3 |
|---|---|---|---|---|
| Composition of polymer composition fed (%) | | | | |
| Polymer | 50.3 | 60.0 | 60.0 | 60.0 |
| MMA | 29.1 | 25.6 | 25.6 | 25.6 |
| Comonomer | 7.3 | 1.1 | 1.1 | 1.1 |
| Solvent | 13.3 | 13.3 | 13.3 | 13.3 |
| Temp. of polymer composition at feed (°C.) | 150 | 150 | 150 | 150 |
| Feed rate of polymer composition (kg/hr) | 1.0 | 1.0 | 1.0 | 1.0 |
| Temp. at outlet of heater (°C.) | 180 | 180 | 180 | 180 |
| Internal pressure of heater (kg/cm$^2$G) | 25 | 25 | 24 | 9 |
| Flush nozzle used | (A) | (A) | (A) | (A) |
| Amount of introduced inert gas (l/min) | 0.6 | 0.6 | 0.6 | 0.6 |
| Internal pressure of tank (kg/cm$^2$G) | 0.0 | 0.0 | 0.0 | 1.0 |
| Remaining volatile components after devolatilization (%) | | | | |
| MMA | 4.10 | 3.20 | 3.50 | 8.30 |
| Comonomer | 1.03 | 0.13 | 0.15 | 0.35 |
| Solvent | 0.03 | 0.03 | 0.03 | 6.30 |
| Temp. of extruder barrel (°C.) | 220 | 230 | 230 | 230 |
| Vacuum degree in vent of extruder (Torr) | 150 | 150 | 150 | 150 |
| Remaining volatile components in extruded pellet (%) | | | | |
| MMA | 0.32 | 0.33 | 0.31 | 0.55 |
| Comonomer | 0.08 | 0.01 | 0.01 | 0.02 |
| Solvent | ND | ND | ND | 0.63 |
| Total light transmission (%) | 93 | 93 | 93 | 93 |

EXAMPLES 41 to 44

Polymer compositions of various compositions were prepared, and then subjected to a devolatilizing treatment under various conditions in the same manner as in Example 1, and a vent extruder as in Example 1 was used to obtain pellets of polymers. Table 9 shows the compositions of the polymers, heating temperature and feed rates, devolatilizing conditions, and the remaining volatile components and the total light transmissions of the polymers obtained by devolatilization and extrusion treatment.

TABLE 9

| | Example 41 | Example 42 | Example 43 | Example 44 |
|---|---|---|---|---|
| Comonomer used | MA | MA | MA | MA |
| Its ratio in polymer | 4 | 8 | 4 | 4 |
| Solvent used | ME | ME | ME | ME |
| Composition of polymer composition fed (%) | | | | |
| Polymer | 60.0 | 70.0 | 55.4 | 50.0 |
| MMA | 25.6 | 15.4 | 23.7 | 20.2 |
| Comonomer | 1.1 | 1.3 | 1.0 | 0.8 |
| Solvent | 13.3 | 13.3 | 20.0 | 29.0 |
| Temp. of polymer composition at feed (°C.) | 150 | 150 | 150 | 150 |
| Feed rate of polymer composition (kg/hr) | 1.0 | 1.0 | 1.0 | 1.0 |
| Temp. at outlet of heater(°C.) | 150 | 160 | 170 | 180 |
| Internal pressure of heater (kg/cm$^2$G) | 15 | 20 | 25 | 30 |
| Flush nozzle used | (A) | (A) | (A) | (A) |
| Internal Pressure of tank (kg/cm$^2$G) | 0.0 | 0.0 | 0.0 | 0.0 |
| Remaining volatile components after devolatilization (%) | | | | |
| MMA | 5.13 | 2.57 | 4.73 | 4.04 |
| Comonomer | 0.15 | 0.16 | 0.14 | 0.12 |
| Solvent | 0.33 | 0.27 | 0.40 | 0.48 |
| Temp. of extruder barrel (°C.) | 230 | 230 | 230 | 230 |
| Vacuum degree in vent of extruder (Torr) | 150 | 150 | 150 | 200 |
| Remaining volatile components in extruded pellet (%) | | | | |
| MMA | 0.34 | 0.17 | 0.32 | 0.27 |
| Comonomer | 0.01 | 0.01 | 0.01 | 0.01 |
| Solvent | ND | ND | ND | ND |
| Total light transmission (%) | 93 | 93 | 93 | 93 |

What is claimed is:

1. A process for purifying a polymer by separating and removing volatile components from a polymer composition containing the volatile components, which comprises:
   (a) heating a polymer composition containing a methanol solvent to a temperature of 120° C. to 200° C. by a heater, the polymer composition comprising:
       (i) 30 to 90% by weight of a polymer comprising 75 to 100% by weight of methyl methacrylate as a monomer component, or a polymer comprising 30 to 74% by weight of methyl methacrylate and 70 to 26% by weight of styrene, as monomer components,
       (ii) 10 to 40% by weight of unreacted monomer, and
       (iii) 6 to 35% by weight of methanol,
   wherein an internal pressure of the heater is maintained at 8 to 35 kg/cm$^2$G;
   (b) discharging the heated polymer composition from step (a) into a tank in which pressure is maintained at −0.7 to 1.0 kg/cm$^2$G, and then separating and collecting most of the volatile components to lower the concentration of the solvent in the remaining volatile components in the polymer composition to 0.5% by weight or less; and
   (c) feeding the resultant polymer composition from step (b) to a vent extruder maintained such that a barrel temperature at an inner side thereof is set to a temperature of 160° to 280° C. and pressure in a vent portion is set to 5 to 400 Torr, and then extruding the polymer composition to lower the content of the remaining volatile components in the polymer composition to 1% by weight or less.

2. The process according to claim 1 wherein in step (a) the polymer composition is heated to a temperature of 150° to 200° C., and then discharged through a flush nozzle into a tank in which pressure is maintained at −0.5 to 0.5 kg/cm$^2$G.

3. The process according to claim 2 wherein the flush nozzle through which the polymer composition is discharged is selected from the group consisting of a strand die, a needle valve, a diehead valve, a vent plug, a flat die and a circular die.

4. The process according to claim 1 wherein the polymer composition is prepared by adding methanol to a polymer composition obtained by bulk polymerization or solution polymerization.

5. A process for purifying a polymer by separating and removing volatile components from a polymer composition containing the volatile components, which comprises:
- (a) heating the polymer composition containing a methanol solvent to a temperature of 120° C. to 200° C. by a heater, the polymer composition comprising:
  - (i) 30 to 90% by weight of a polymer comprising 75 to 100% by weight of methyl methacrylate as a monomer component, or a polymer comprising 30 to 74% by weight of methyl methacrylate and 70 to 26% by weight of styrene, as monomer components,
  - (ii) 10 to 40% by weight of unreacted monomer, and
  - (iii) 6 to 35% by weight of methanol, wherein an internal pressure of the heater is maintained at 8 to 35 $kg/cm^2 G$;
- (b) introducing inert gas into the polymer composition before or during said heating;
- (c) discharging the heated polymer composition into a tank in which pressure is maintained at −0.7 to 1.0 $kg/cm^2 G$, and then separating and collecting most of the volatile components to lower the concentration of the solvent in the remaining volatile components in the polymer composition to 0.5% by weight or less; and
- (d) feeding the resultant polymer composition to a vent extruder maintained so that a barrel temperature at an inner side thereof is set to a temperature of 180° to 270° C. and pressure in a vent portion is set to 5 to 400 Torr, and then extruding the polymer composition to lower the content of the remaining volatile components in the polymer composition to 1% by weight or less.

6. The process according to claim 5 wherein the inert gas is nitrogen.

7. The process according to claim 5 wherein in step (a) the polymer composition is heated to a temperature of 150° to 200° C., and then discharged through a flush nozzle into a tank in which pressure is maintained at −0.5 to 0.5 $kg/cm^2 G$.

8. The process according to claim 7 wherein the flush nozzle through which the polymer composition is discharged is selected from the group consisting of a strand die, a needle valve, a diehead valve, a vent plug, a flat die, a circular die and an inflation die.

9. The process according to claim 5 wherein the polymer composition is prepared by adding methanol to a polymer composition obtained by bulk polymerization or solution polymerization.

10. The process according to claim 1 wherein the polymer composition discharged into the tank in step (b) is at a temperature of 80° to 170° C.

11. The process according to claim 1 wherein the pressure in the vent portion in the vent extruder in step (c) is 50 to 200 Torr.

12. The process according to claim 1 wherein the volatile components separated in the vent extruder in step (c) are drawn through 1 to 3 vent holes.

13. The process according to claim 1 wherein the polymer composition discharged into the tank in step (b) is at a temperature of 80° to 170° C.

14. The process according to claim 1 wherein the pressure in the vent portion in the vent extruder in step (c) is 50 to 200 Torr.

15. The process according to claim 1 wherein the volatile components separated in the vent extruder in step (c) are drawn through 1 to 3 vent holes.

* * * * *